(12) United States Patent
Ohnishi et al.

(10) Patent No.: US 12,142,799 B2
(45) Date of Patent: Nov. 12, 2024

(54) ELECTROCHEMICAL ELEMENT STACK, ELECTROCHEMICAL ELEMENT, ELECTROCHEMICAL MODULE, ELECTROCHEMICAL DEVICE, AND ENERGY SYSTEM

(71) Applicant: Osaka Gas Co., Ltd., Osaka (JP)

(72) Inventors: Hisao Ohnishi, Osaka (JP); Mitsuaki Echigo, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 1003 days.

(21) Appl. No.: 17/043,810

(22) PCT Filed: Mar. 29, 2019

(86) PCT No.: PCT/JP2019/014380
§ 371 (c)(1),
(2) Date: Dec. 16, 2020

(87) PCT Pub. No.: WO2019/189915
PCT Pub. Date: Oct. 3, 2019

(65) Prior Publication Data
US 2021/0111415 A1    Apr. 15, 2021

(30) Foreign Application Priority Data
Mar. 30, 2018    (JP) ................. 2018-070344

(51) Int. Cl.
*H01M 8/0258* (2016.01)
*H01M 8/0606* (2016.01)
*H01M 8/1213* (2016.01)
*H01M 8/2432* (2016.01)
*H01M 8/2475* (2016.01)
*H01M 8/2483* (2016.01)

(52) U.S. Cl.
CPC ....... *H01M 8/0258* (2013.01); *H01M 8/0606* (2013.01); *H01M 8/1213* (2013.01); *H01M 8/2432* (2016.02); *H01M 8/2475* (2013.01); *H01M 8/2483* (2016.02)

(58) Field of Classification Search
CPC ............. H01M 8/0258; H01M 8/0606; H01M 8/1213; H01M 8/2432; H01M 8/2475; H01M 8/2483; H01M 8/0204; H01M 8/0612; H01M 8/04007; H01M 8/2457; H01M 8/2484; H01M 8/023; H01M 8/0278; H01M 8/0618; H01M 8/1226; Y02E 60/50
See application file for complete search history.

(56) References Cited

U.S. PATENT DOCUMENTS

| 5,476,375 A | 12/1995 | Khinkis et al. |
| 5,554,454 A * | 9/1996 | Gardner ............. H01M 8/0245 |
| | | 429/479 |
| 5,830,592 A | 11/1998 | Akagi |
| 6,372,375 B1 | 4/2002 | Lawless |
| 8,703,353 B2 | 4/2014 | Jeong |
| 9,853,299 B2 | 12/2017 | Jeong |
| 2004/0217011 A1 | 11/2004 | Strobel et al. |
| 2005/0008911 A1 | 1/2005 | Kaye |
| 2005/0061003 A1 | 3/2005 | Miyauchi et al. |
| 2006/0093891 A1 | 5/2006 | Issacci et al. |
| 2006/0137332 A1 | 6/2006 | Allgeier et al. |
| 2007/0269703 A1 | 11/2007 | Kaye |
| 2009/0226786 A1 | 9/2009 | Selcuk et al. |
| 2010/0173208 A1 | 7/2010 | Hatada |
| 2010/0192890 A1 | 8/2010 | Brooks et al. |
| 2011/0207018 A1 | 8/2011 | Nakagawa et al. |
| 2011/0318665 A1 | 12/2011 | Yamamoto et al. |
| 2014/0047814 A1 | 2/2014 | Steinwandel et al. |
| 2015/0180079 A1 | 6/2015 | Leger et al. |
| 2015/0311559 A1 * | 10/2015 | Tsukamoto ......... H01M 8/2425 |
| | | 429/457 |
| 2016/0372778 A1 | 12/2016 | Hotta et al. |
| 2016/0380298 A1 * | 12/2016 | Leah .................... H01M 8/247 |
| | | 429/465 |
| 2017/0110740 A1 | 4/2017 | Gurney et al. |
| 2017/0309941 A1 | 10/2017 | Echigo et al. |
| 2019/0229348 A1 | 7/2019 | Kim et al. |
| 2020/0028193 A1 | 1/2020 | Echigo et al. |
| 2021/0111415 A1 | 4/2021 | Ohnishi et al. |

FOREIGN PATENT DOCUMENTS

| EP | 342395 A1 | 1/2019 |
| JP | 6217959 A | 1/1987 |

(Continued)

OTHER PUBLICATIONS

Choudhury et al., Application of solid oxide fuel cell technology for power generation—A review, Renewable and Sustainable Energy Reviews, Jan. 10, 2013, pp. 430-442, vol. 20.

*Primary Examiner* — Muhammad S Siddiquee
(74) *Attorney, Agent, or Firm* — The Webb Law Firm

(57) ABSTRACT

An electrochemical element stack that includes a plurality of stacked electrochemical elements, each of the electrochemical elements including a plate-like support provided with an internal passage. The plate-like support includes: a gas-permeable portion through which gas passes between the internal passage located inside the plate-like support and the outside; an electrochemical reaction portion covering the gas-permeable portion; and a first penetrated portion forming a supply passage through which fuel gas flows from the outside of the plate-like support to the internal passage. The plate-like supports of two adjacent electrochemical elements are opposed, an outer face of the first electrochemical element on which the electrochemical reaction portion is arranged is electrically connected to an outer face of the second electrochemical element on which the electrochemical reaction portion is not arranged, and a flowing portion through which air flows along the two adjacent outer faces is formed between the two outer faces.

19 Claims, 15 Drawing Sheets

(56) References Cited

FOREIGN PATENT DOCUMENTS

| | | | |
|---|---:|---|---|
| JP | 3225767 | A | 10/1991 |
| JP | 5174858 | A | 7/1993 |
| JP | 982352 | A | 3/1997 |
| JP | 2002518794 | A | 6/2002 |
| JP | 2007227130 | A | 9/2007 |
| JP | 2009117250 | A | 5/2009 |
| JP | 2009277539 | A | 11/2009 |
| JP | 2011216308 | A | 10/2011 |
| JP | 2012129134 | A | 7/2012 |
| JP | 5298758 | B2 | 9/2013 |
| JP | 2015207509 | A | 11/2015 |
| JP | 2016195029 | A | 11/2016 |
| JP | 201741404 | A | 2/2017 |
| JP | 2017508254 | A | 3/2017 |
| JP | 2017183177 | A | 10/2017 |
| JP | 2017183224 | A | 10/2017 |
| JP | 2017188224 | A | 10/2017 |
| JP | 2018174115 | A | 11/2018 |
| JP | 2018200748 | A | 12/2018 |
| KR | 1020100034746 | A | 4/2010 |
| KR | 1020170057366 | A | 5/2017 |
| KR | 20180069953 | A | 6/2018 |
| WO | 2011033745 | A1 | 3/2011 |
| WO | 2018088701 | A1 | 5/2018 |
| WO | 2018199095 | A1 | 11/2018 |
| WO | 2019189915 | A1 | 10/2019 |

\* cited by examiner

ELECTROCHEMICAL ELEMENT STACK, ELECTROCHEMICAL ELEMENT, ELECTROCHEMICAL MODULE, ELECTROCHEMICAL DEVICE, AND ENERGY SYSTEM

CROSS-REFERENCE TO RELATED APPLICATIONS

This application is the United States national phase of International Application No. PCT/JP2019/014380 filed Mar. 29, 2019, and claims priority to Japanese Patent Application No. 2018-070344 filed Mar. 30, 2018, the disclosures of which are hereby incorporated by reference in their entirety.

BACKGROUND OF THE INVENTION

Field of the Invention

The present invention relates to an electrochemical element stack, an electrochemical element, an electrochemical module, an electrochemical device, and an energy system.

Description of Related Art

As disclosed in JP 2017-508254A (Patent Document 1), a conventional electrochemical element stack included in an electrochemical device such as a fuel cell (electrochemical power generating cell) or an electrolytic (electrolysis) cell has a configuration in which many substrates including metal substrates that are each provided with a gas permeable region and on which an electrochemical reaction portion is formed by covering the gas permeable portion, metal substrates that serve as spacers and separators, and the like are stacked in a gastight manner. An air passage for air (oxidative component gas) and a fuel gas passage for fuel gas (reducing component gas) are defined along both sides of the metal substrate (electrochemical element) provided with the electrochemical reaction portion, and air and fuel gas flow through the air passage and the fuel gas passage, respectively. That is, a plurality of electrochemical elements are integrated into an electrochemical element stack. With this configuration, electrochemical output such as electrical power is generated through a reaction between the air and the fuel gas in the electrochemical reaction portion.
Patent Document 1: JP 2017-508254A

SUMMARY OF THE INVENTION

Since the air passages and the fuel gas passages are formed by stacking many substrates in such an electrochemical element stack, it is necessary to firmly fix many metal substrates in a sealed manner. Accordingly, in order to produce such an electrochemical element and an electrochemical element stack, many man-hours and extreme care are needed to reliably and firmly fix the metal substrates. Therefore, the cost of producing such an electrochemical element stack greatly increases, and the reliability of the produced electrochemical element stack (reliability of gas-tightness between the metal substrates, electrical connection therebetween, and the like) decreases.

Accordingly, the present invention was achieved in light of the aforementioned circumstances, and an object thereof is to provide an electrochemical element stack that consists of a small number of components and is easily produced, and to provide an electrochemical element having a structure that is easy to handle during the production of the electrochemical element stack. Also, a further object of the present invention is to provide, at low cost, an electrochemical module, an electrochemical device, and an energy system in which the electrochemical element stack is used.

In order to achieve the above-mentioned objects, in a characteristic configuration of an electrochemical element stack including a plurality of electrochemical elements that are arranged in a stacked manner,
- each of the electrochemical elements includes conductive plate-like support provided with an internal passage therein,
- the plate-like support includes: a gas-permeable portion through which gas is permeable between the internal passage, which is located inside the plate-like support, and the outside; an electrochemical reaction portion that entirely or partially covers the gas-permeable portion and includes at least a film-like electrode layer, a film-like electrolyte layer, and a film-like counter electrode layer in the stated order; and a first penetrated portion that forms a supply passage through which a first gas flows between the outside of the plate-like support in a surface penetration direction and the internal passage, the first gas being one of a reducing component gas and an oxidative component gas,
- at least a first electrochemical element and a second electrochemical element of the plurality of electrochemical elements are adjacently stacked, and
- the plate-like support included in the first electrochemical element and the plate-like support included in the second electrochemical element are opposed to each other, an outer face of the plate-like support included in the first electrochemical element on which the electrochemical reaction portion is arranged is electrically connected to an outer face of the plate-like support included in the second electrochemical element other than an outer face on which the electrochemical reaction portion is arranged, and a flowing portion through which a second gas flows along the two adjacent outer faces is formed between the two outer faces, the second gas being the other of the reducing component gas and the oxidative component gas.

That is, since the electrochemical element includes the plate-like support provided with the internal passage, the first gas and the second gas can separately flow in a state in which the internal passage is separated from the outside. When the electrochemical element is allowed to function as a fuel cell (electrochemical power generating cell) "that converts chemical energy such as fuel into electric energy", the first gas is one of a reducing component gas such as hydrogen gas and an oxidative component gas such as air that are consumed in an electrochemical reaction, and the second gas is the other. When the electrochemical element is allowed to function as an electrolytic (electrolysis) cell "that converts electric energy into chemical energy such as fuel", the first gas is one of a reducing component gas such as hydrogen gas and an oxidative component gas such as oxygen that are generated through an electrochemical reaction, and the second gas is the other. Moreover, the plate-like support includes the gas-permeable portion through which gas is permeable between the internal passage, which is located inside the plate-like support, and the outside, and the electrochemical reaction portion that entirely or partially covers the gas-permeable portion and includes the film-like electrode layer, the film-like electrolyte layer, and the film-like counter electrode layer in the stated order, and therefore, when the electrochemical element is allowed to function as a fuel cell (electrochemical power generating cell), the first gas and the second gas reach the electrochemical reaction portion through a channel extending from the outside of the plate-like support and a channel extending from the internal passage to the gas-permeable portion of the plate-like support, and react with each other on the electrode layer and the counter electrode layer, thus making it possible to cause an electrochemical reaction through which electricity is generated, for example. When the electrochemical element is allowed to function as an electrolytic cell, the first gas and the second gas are generated through an electrolytic reaction of water by supplying electricity to the electrochemical reaction portion, and the first gas and the second gas can be discharged through a channel on the outside of the plate-like support and a channel extending from the gas-permeable portion of the plate-like support to the internal passage.

In the above-mentioned configuration, the plate-like support has electric conductivity because it is necessary to electrically extract electrochemical output or supply electricity. Examples of such a conductive material include metal and conductive ceramics. In particular, metal is preferably used because metal can be easily processed to form a tough configuration.

In the above-mentioned configuration, the internal passage need only be delimited by the faces that are opposed to each other in the plate-like support and be formed therebetween, but need not be formed in a sealed manner in the electrochemical element. It is sufficient that a configuration is employed in which a gastight passage is formed when the electrochemical elements are stacked to form an electrochemical element stack.

In the above-mentioned configuration, the plate-like support may be provided with the gas-permeable portion as a portion provided with many through holes passing through the plate-like support from the front side to the back side or as a portion having a porous structure. When the gas-permeable portion is formed as a portion provided with through holes, the gas-permeable portion can be more easily and selectively provided in the support, and the strength of the support can be further improved. Accordingly, an electrochemical element having more excellent strength and durability can be more easily realized. When the gas-permeable portion is provided as a portion having a porous structure, the gas-permeable portion can be more easily formed, and a gas permeable member having a flat surface can be easily formed, thus making it possible to improve the yield of the formation of the electrochemical reaction portion. That is, the electrochemical element can be more easily manufactured.

Since the plate-like support is provided with the first penetrated portion that forms the supply passage through which the first gas flows between the outside of the plate-like support in a surface penetration direction and the internal passage, the first gas can flow into the internal passage via the first penetrated portion. In this case, the first penetrated portion is open toward the space in which the second gas flows, but the first gas flows in the state of being separated from the second gas that flows along the outer face of the plate-like support, and thus the first gas and the second gas can be appropriately introduced into the electrochemical reaction portion or discharged from the electrochemical reaction portion. Moreover, since the configuration is employed in which the first gas flows into the internal passage via the first penetrated portion, the first gas also flows into the internal passage of the adjacent plate-like support via the first penetrated portion. Therefore, merely by employing a configuration in which the plate-like supports are stacked such that the first penetrated portions are in communication with each other, the first gas can flow into all the internal passages of the plate-like supports that has been stacked. This is a very simple configuration compared with a configuration in which the plate-like supports are individually provided with a supply passage, and therefore, an electrochemical element stack can be easily assembled and thus be reliably produced at low cost.

It should be noted that the surface penetration direction of the plate-like support is a direction that extends passing through the plate-like support, and the first penetrated portion is formed so as to pass through the plate-like support. However, the first penetrated portion need not be necessarily formed such that those passing through the plate-like supports are coaxial with each other on the faces that are opposed to each other with the internal passage being located therebetween, and it is sufficient that the first penetrated portions pass through the plate-like supports so as to be in communication with each other via the internal passages. It is sufficient that a configuration is employed in which the first penetrated portions form a supply passage through which the first gas flows between the adjacent electrochemical elements when a plurality of electrochemical elements are arranged in a stacked manner.

Accordingly, the above-mentioned electrochemical element can be treated as a plate-like support having a simple configuration in which the plate-like support is merely provided with the gas-permeable portion and the electrochemical reaction portion, and an electrochemical reaction can be caused in the electrochemical reaction portion of each individual electrochemical element. This electrochemical element has a simple configuration and is thus highly convenient in terms of handling when many electrochemical elements are used in combination. Furthermore, when many electrochemical elements are used in combination, a simple structure obtained merely by connecting those having the same structure such that the first penetrated portions are in communication with each other can be employed, and therefore, an electrochemical element stack can be easily assembled and thus be reliably produced at low cost.

The electrochemical element stack is obtained by arranging a plurality of electrochemical elements in a stacked manner. Since the plate-like support included in the first electrochemical element and the plate-like support included in the second electrochemical element are opposed to each other, the first and second electrochemical elements are aligned with each other. Moreover, the outer face of the plate-like support included in the first electrochemical element on which the electrochemical reaction portion is arranged is electrically connected to the outer face of the plate-like support included in the second electrochemical element other than the outer face on which the electrochemical reaction portion is arranged, and therefore, in the state in which the electrochemical elements are aligned and stacked, the electrochemical reaction portions provided in the electrochemical element are stacked in series and electrically connected to each other. Furthermore, since the flowing portion through which the second gas flows along the adjacent outer faces is formed between the two outer faces, the first gas can flow into one of the electrode layer and the counter electrode layer in the electrochemical reaction portion from the first penetrated portion via the internal passage and the gas-permeable portion, and the second gas can flow into the other of the electrode layer and the counter electrode layer via flowing portion. Accordingly, the electrochemical reaction portions of the electrochemical elements that are aligned and stacked are connected to each other in series in the same direction, and the first gas and the second gas flows into each of the electrochemical reaction portions so as to correspond to the electrode layer and the counter electrode layer thereof. When the electrochemical element is allowed to function as a fuel cell (electrochemical power generating cell), electrochemical output from the plurality of electrochemical elements can be collectively extracted, that is, greatly amplified power can be extracted as electrochemical output. When the electrochemical element is allowed to function as an electrolytic cell, a large amount of a reducing component gas such as hydrogen gas and an oxidative component gas such as oxygen that are generated from the plurality of electrochemical elements can be collectively extracted.

With the above-mentioned configuration, each of the electrochemical elements includes the conductive plate-like support and the electrochemical reaction portion, and the plate-like support and the electrochemical reaction portion are integrated with each other. Therefore, the electrochemical elements can be used to form an electrochemical element stack that is configured to generate electrochemical output using a minimum required and very small number of members and can be easily and reliably produced. Also, the electrochemical element has a structure that is easy to handle during the production of the electrochemical element stack.

The electrochemical element stack can be configured such that a first annular sealing portion serving as an annular sealing portion for separating the first penetrated portion that is formed on each of the two outer faces from the flowing portion is provided in the flowing portion, and the supply passage through which the first gas flows to the internal passage is formed by the first penetrated portion and the first annular sealing portion.

That is, providing the first annular sealing portions makes it possible to connect the first penetrated portions of the electrochemical elements stacked in the electrochemical element stack such that the first penetrated portions are in communication with each other in a state of being separated from the flowing portions. Accordingly, employing a very simple configuration in which the first penetrated portions of the adjacent electrochemical elements are connected to each other in a gastight manner makes it possible to connect the electrochemical elements such that the electrochemical elements appropriately operate using the first gas and the second gas. Therefore, the electrochemical elements can be used to form an electrochemical element stack that can be easily and reliably produced. Also, the electrochemical element has a structure that is easy to handle during the production of the electrochemical element stack.

There is no limitation on the shape of the annular sealing portion as long as a configuration is obtained in which the penetrated portions are in communication with each other and leakage of gas can be prevented. That is, it is sufficient that the annular sealing portion has an endless shape provided with an opening portion that is in communication with the penetrated portion therein, and is configured to seal a gap between the adjacent electrochemical elements. The annular sealing portion has, for example, an annular shape. The annular shape may be any of an annular circle, an annular ellipse, an annular square, an annular polygon, and the like.

A configuration can be employed in which the plate-like support includes a second penetrated portion that forms a discharge passage through which the first gas that has flowed in the internal passage flows to the outside of the plate-like support in the surface penetration direction, a second annular sealing portion serving as an annular sealing portion for separating the second penetrated portion that is formed on each of the two outer faces from the flowing portion is provided in the flowing portion, and the discharge passage into which the first gas that has flowed in the internal passage flows is formed by the second penetrated portion and the second annular sealing portion.

That is, for example, when the electrochemical element is allowed to function as a fuel cell (electrochemical power generating cell), the first gas that has entered the internal passage from the first penetrated portion flows through the internal passage to the electrochemical reaction portion via the gas-permeable portion, and the remainder flows into the second penetrated portion that forms a discharge passage. The discharge passage is formed in the state in which the second penetrated portion is separated from the second gas, and thus the first gas can be collected from the discharge passage independently of the second gas. This discharge passage includes an annular sealing portion as in the case of the supply passage formed by the first penetrated portion. Accordingly, by employing a very simple configuration in which the second penetrated portions of the adjacent electrochemical elements are connected to each other in a gastight manner, the second penetrated portions can be connected such that the second penetrated portions are in communication with each other in a state of being separated from the flowing portions, and the electrochemical elements can be connected to each other such that the electrochemical elements appropriately operate using the first gas and the second gas. Therefore, the electrochemical elements can be used to form an electrochemical element stack that can be easily and reliably produced. Also, the electrochemical element has a structure that is easy to handle during the production of the electrochemical element stack.

It should be noted that an insulating sealing portion that electrically insulates adjacent electrical elements from each other can be used as the annular sealing portion.

In the above-mentioned configuration, portions of the electrochemical element other than the electrochemical reaction portion need to be insulated in order to connect, in series, the electrochemical reaction portions of the electrochemical elements that are stacked and are adjacent to each other and collect power therefrom as electrochemical output or apply voltage that is necessary for electrolysis thereto. If the insulating sealing portions that electrically insulate the adjacent electrical elements from each other are used as the first and second annular sealing portions, these annular sealing portions exhibit an insulating function while forming the supply unit and the discharge unit, and therefore, there is no need to provide members for insulation in addition to the annular sealing portions, thus making it possible to form an electrochemical element stack having a simple configuration. Accordingly, the electrochemical elements can be used to form an electrochemical element stack that can be easily and reliably produced. Also, the electrochemical element has a structure that is easy to handle during the production of the electrochemical element stack.

In order to achieve the above-mentioned object, a characteristic configuration of an electrochemical element to be used in the electrochemical element stack includes the plate-like support, wherein the plate-like support includes the gas-permeable portion, the electrochemical reaction portion, and the first penetrated portion.

That is, since the plate-like support is included, the above-mentioned electrochemical element stack can be formed by stacking the plate-like supports. The plate-like support includes the gas-permeable portion, the electrochemical reaction portion, and the first penetrated portion, and therefore, when the electrochemical element is allowed to function as a fuel cell (electrochemical power generating cell), for example, each of the electrochemical elements in the electrochemical element stack generates electrochemical output in the electrochemical reaction portion, and the electrochemical output from the plurality of electrochemical elements can be collectively extracted, that is, greatly amplified power can be extracted as electrochemical output.

In order to achieve the above-mentioned object, a characteristic configuration of an electrochemical element includes conductive plate-like support provided with an internal passage therein, wherein the plate-like support includes: a gas-permeable portion through which gas is permeable between the internal passage, which is located inside the plate-like support, and the outside, in the plate-like support; an electrochemical reaction portion that entirely or partially covers the gas-permeable portion and includes at least a film-like electrode layer, a film-like electrolyte layer, and a film-like counter electrode layer in the stated order; and a first penetrated portion that forms a supply passage through which a first gas flows between the outside of the plate-like support in a surface penetration direction and the internal passage, the first gas being one of a reducing component gas and an oxidative component gas, and the first gas flows through the first penetrated portion and the internal passage in a state of being separated from a second gas that flows along an outer face of the plate-like support, the second gas being the other of the reducing component gas and the oxidative component gas.

With the above-mentioned configuration, since the electrochemical element includes the conductive plate-like support provided with the internal passage therein, the first gas and the second gas can separately flow in a state in which the internal passage is separated from the outside when this plate-like support is used. The first gas is one of a reducing component gas such as hydrogen gas and an oxidative component gas such as air, and the second gas is the other. Moreover, the plate-like support includes the gas-permeable portion through which gas is permeable between the internal passage, which is located inside the plate-like support, and the outside, and the electrochemical reaction portion that entirely or partially covers the gas-permeable portion and includes the film-like electrode layer, the film-like electrolyte layer, and the film-like counter electrode layer in the stated order, and therefore, when the electrochemical element is allowed to function as a fuel cell (electrochemical power generating cell), for example, the first gas and the second gas reach the electrochemical reaction portion through a channel extending from the outside of the plate-like support and a channel extending from the internal passage to the gas-permeable portion of the plate-like support, and react with each other on the electrode layer and the counter electrode layer, thus making it possible to cause an electrochemical reaction through which electricity is generated, for example.

In the above-mentioned configuration, the plate-like support has electric conductivity because it is necessary to electrically extract electrochemical output or supply electricity. Examples of such a conductive material include metal and conductive ceramics. In particular, using metal makes it easy to ensure the strength and electric conductivity of the support and prevent gas from flowing between the inside and outside at portions of the support other than the gas-permeable portion. Also, the thermal conductivity of the plate-like support can be increased, and the temperature distribution inside the plate-like support decreases, thus making it possible to avoid breakage due to the occurrence of stress distribution. Accordingly, this configuration is preferable because an electrochemical element having more excellent strength, reliability, durability, and performance can be realized.

In the above-mentioned configuration, the internal passage is delimited by the faces that are opposed to each other in the plate-like support and is formed therebetween, but need not be formed in a sealed manner in the electrochemical element. It is sufficient that a configuration is employed in which a gastight passage is formed when the electrochemical elements are stacked to form an electrochemical element stack.

In the above-mentioned configuration, the plate-like support may be provided with the gas-permeable portion as a portion provided with many through holes passing through the plate-like support from the front side to the back side or as a portion having a porous structure.

Since the plate-like support is provided with a first penetrated portion that forms the supply passage through which the first gas flows from the outside of the plate-like support in a surface penetration direction to the internal passage, the first gas can flow into the internal passage via the first penetrated portion. In this case, the first penetrated portion is open toward the space in which the second gas flows, but the first penetrated portion and the internal passage are configured such that the first gas flows in the state of being separated from the second gas that flows along the outer face of the plate-like support, and thus the first gas and the second gas can be appropriately introduced into the electrochemical reaction portion.

It should be noted that the surface penetration direction of the plate-like support is a direction that extends passing through the plate-like support, and the penetrated portion is formed so as to pass through the plate-like support. However, the penetrated portion need not be necessarily formed such that those passing through the plate-like supports are coaxial with each other on the faces that are opposed to each other with the internal passage being located therebetween, and it is sufficient that the penetrated portions pass through the plate-like supports so as to be in communication with each other via the internal passages. It is sufficient that a configuration is employed in which the penetrated portions form the supply passage through which the first gas flows between the adjacent electrochemical elements when a plurality of electrochemical elements are arranged in a stacked manner.

Accordingly, the above-mentioned electrochemical element can be treated as a plate-like support having a simple configuration in which the plate-like support is merely provided with the gas-permeable portion and the electrochemical reaction portion, and an electrochemical reaction can be caused in the electrochemical reaction portion of each individual electrochemical element. This electrochemical element has a simple configuration and is thus highly convenient in terms of handling when many electrochemical elements are used in combination. Furthermore, when many electrochemical elements are used in combination, a simple structure obtained merely by connecting those having the same structure such that the first penetrated portions are in communication with each other can be employed, and therefore, an electrochemical element stack can be easily assembled and thus be reliably produced at low cost.

Also, a configuration can be employed in which the plate-like support includes a second penetrated portion through which the first gas that has flowed along the inner face of the plate-like support in the internal passage flows to the outside of the plate-like support in a surface penetration direction, and the first gas flows through the second penetrated portion in a state of being separated from the second gas, and the internal passage includes a plurality of auxiliary passages that lead from the first penetrated portion to the second penetrated portion.

With the above-mentioned configuration, when the electrochemical element is allowed to function as a fuel cell (electrochemical power generating cell), for example, the first gas that has flowed from the first penetrated portion into the electrochemical element and has entered the internal passage flows toward the second penetrated portion in a state of being separated from the second gas. At this time, the first gas moves along the inner faces of the plate-like support. The first gas flows into a plurality of passages in the internal passage, and thus flows separately along the plurality of passages. There is a possibility that the flow resistance of the first gas in the central portion of the plate-like support differs from that in the peripheral portion thereof, and thus the flow rate of the first gas varies. Due to such a difference in the flow rate, the amount of the first gas that reaches the electrochemical reaction portion varies, and thus the efficiency of generating electrochemical output varies. Accordingly, there is a concern that problems arise in that a temperature rises locally and some portions rapidly deteriorates. However, the flow rates of the first gas at multiple random positions in a flow-intersection direction that intersects with the gas flowing direction are made substantially equal by a flow straightening effect due to the first gas flowing separately in a plurality of auxiliary passages as described above compared with the case where the first gas flows in an internal passage that is not provided with a plurality of auxiliary passages. That is, the gas flow rates are substantially equal at multiple random positions including the central portion and the two end portions in the flow-intersection direction. Thus, the amounts of gas that flows into the electrochemical reaction portion can be made substantially equal at multiple random positions including the central portion and the two end portions in the flow-intersection direction. Accordingly, in the electrochemical reaction portion, a difference between a portion that is deficient in gas and a portion in which an excessive amount of gas flows can be reduced, and power is generated in the overall electrochemical element, thus making it possible to improve power generation efficiency of an electrochemical reaction. Furthermore, a uniform reaction site can be formed all over a large region in the electrochemical reaction portion. Thus, the above-mentioned problems can be suppressed.

Furthermore, the electrochemical element may include a distribution portion that is located between the first penetrated portion and the internal passage in the plate-like support, is in communication with the auxiliary passages, and distributes the first gas that has flowed in the first penetrated portion, to the auxiliary passages.

With this configuration, the distribution portion can further promote the formation of uniform flow of the first gas by equally distributing the first gas to the auxiliary passages of the internal passage.

A film-like intermediate layer may be arranged between the electrode layer and the electrolyte layer. A film-like reaction preventing layer may be arranged between the counter electrode layer and the electrolyte layer.

With the above-mentioned configuration, arranging the film-like intermediate layer between the electrode layer and the electrolyte layer effectively suppresses reactions between the material constituting the electrode and the material constituting the electrolyte layer and makes it possible to realize an electrochemical element having excellent long-term stability in performance. Arranging the film-like reaction preventing layer between the counter electrode and the electrolyte layer makes it possible to realize an electrochemical element having more excellent performance, reliability, and durability.

A configuration may also be employed in which the internal passage includes a plurality of auxiliary passages through which the first gas flows in a predetermined flowing direction, and a distribution portion that is provided on an upstream side of the plurality of auxiliary passage in the first gas flowing direction, and the plate-like support includes a supply structure that is located between the distribution portion and the plurality of auxiliary passages in the flowing direction and with which the first gas is temporarily stored in the distribution portion and supply of the first gas from the distribution portion to the plurality of auxiliary passages is limited.

With the above-mentioned configuration, the plate-like support is provided with the internal passage through which the first gas flows therein. The internal passage includes the distribution portion and the plurality of auxiliary passages, and the distribution portion is located on the upstream side with respect to the auxiliary passages in the direction in which the first gas flows. The plate-like support is provided with the supply structure between the distribution portion and the plurality of auxiliary passages in the flowing direction. Due to the supply structure, the first gas is temporarily stored in the distribution portion and distributed from the distribution portion to the plurality of auxiliary passages. Providing such a supply structure makes it possible to substantially uniformly supply the first gas from the distribution portion to the auxiliary passages. Accordingly, the reaction efficiency of the electrochemical element can be improved.

The following is a more specific description. The supply structure having the above-mentioned configuration are provided between the distribution portion and the plurality of auxiliary passages, and serves as a barrier for the flow of the first gas from the distribution portion to the plurality of auxiliary passages. Accordingly, pressure loss of the first gas increases when the first gas flows from the distribution portion to the plurality of auxiliary passages, and the first gas introduced into the distribution portion is distributed over the distribution portion so as to fill the distribution portion and is thus temporarily stored therein. Accordingly, the overall pressure in the distribution portion is substantially uniform (equal pressure). That is, differences in pressure between the distribution portion and the plurality of auxiliary passages are substantially the same. Then, the first gas is supplied from the distribution portion to the plurality of auxiliary passages, and therefore, the first gas is supplied to the auxiliary passages with substantially equal pressure. Accordingly, the flow distribution (including the flow rate, the flow amount, the pressure, and the like) of the first gas in the flow direction is substantially uniform among the auxiliary passages.

Flow of the first gas from the distribution portion is divided and introduced into the plurality of auxiliary passages. The flow distribution (including the flow rate, the flow amount, the pressure, and the like) of the first gas is also made substantially equal by a flow straightening effect due to the first gas flowing separately in a plurality of passages compared with the case where the first gas flows in an internal passage that is not provided with a plurality of passages.

A configuration may also be employed in which the internal passage includes a confluence portion that is provided on a downstream side of the plurality of auxiliary passages in a predetermined direction in which the first gas flows, and the plate-like support includes a discharge structure that is located between the plurality of auxiliary passages and the confluence portion in the flowing direction and with which discharge of the first gas from the plurality of auxiliary passages to the confluence portion is limited.

With the above-mentioned configuration, the supply structure for supplying the first gas from the distribution portion to the plurality of auxiliary passages with substantially uniform flow distribution is provided, and in addition, the discharge structure is provided at a position where the first gas enters the confluence portion from the plurality of auxiliary passages. The plurality of auxiliary passages are located between the supply structure and the discharge structure, thus making it possible to make the flow distribution (including the flow rate, the flow amount, the pressure, and the like) of the first gas substantially uniform among the plurality of auxiliary passages and to improve the reaction efficiency of an electrochemical reaction.

The following is a more specific description. The discharge structure having the above-mentioned configuration is provided between the plurality of auxiliary passages and the confluence portion serves as a barrier for flow of the first gas from the auxiliary passages to the confluence portion. Accordingly, pressure loss of the first gas increases when the first gas flows from the plurality of auxiliary passages into the confluence portion. Therefore, the first gas introduced into the plurality of auxiliary passages is less likely to be immediately introduced into the confluence portion from the plurality of auxiliary passages, and is distributed over the plurality of auxiliary passages so as to fill the auxiliary passages. This makes it possible to make the flow distribution (including the flow rate, the flow amount, the pressure, and the like) of the first gas in the flowing direction substantially uniform among the plurality of auxiliary passages. Moreover, the first gas is distributed over the plurality of auxiliary passages so as to fill the auxiliary passages, and therefore, an electrochemical reaction sufficiently occurs in the plurality of auxiliary passages. Accordingly, the reaction efficiency of an electrochemical reaction can be improved.

A characteristic configuration of an electrochemical module of the present invention includes a housing that is internally provided with the electrochemical element stack;

a first gas supply unit that allows the first gas to flow from the outside of the housing to the internal passage via the supply passage; and a second gas supply unit that allows the second gas to flow from the outside of the housing to the flowing portion.

With the above-mentioned configuration, when the electrochemical element is allowed to function as a fuel cell (electrochemical power generating cell), for example, the first gas supply unit allows the first gas to flow from the outside of the housing into the internal passage via the supply passage, and therefore, the first gas can flow into the electrochemical reaction portions in the electrochemical element stack. The second gas supply unit allows the second gas to flow from the outside of the housing into the flowing portion, and therefore, the second gas can flow into the electrochemical reaction portions via the flowing portion. As a result, electrochemical output can be generated through a reaction between the first gas and the second gas in the electrochemical reaction portion. When the above-mentioned configuration further includes an output portion to which the output is provided, large output can be extracted in the output portion as the total of the output from the electrochemical elements.

Another characteristic configuration of the electrochemical module of the present invention includes, inside the housing, a distribution chamber in which the second gas that flows from the second gas supply unit flows and is distributed to the flowing portion. The "supply units" serve to supply the first gas and the second gas when the electrochemical element is allowed to function as a fuel cell (electrochemical power generating cell) "that converts chemical energy such as fuel into electric energy", whereas the "supply units" serve to discharge gas containing the first gas and the second gas when the electrochemical element is allowed to function as an electrolytic cell "that converts electric energy into chemical energy such as fuel".

With the above-mentioned configuration, the second gas is equally distributed to the flowing portions due to the distribution chamber, and therefore, the second gas is equally distributed to the electrochemical elements, thus making it possible to allow the electrochemical elements to equally generate electrochemical output.

As described above, the electrochemical module can be formed in a simple configuration including the housing that is internally provided with the electrochemical element stack, and the first gas supply unit, the second gas supply unit, and the distribution chamber, which are provided inside the housing. Accordingly, the electrochemical module can be easily and reliably assembled, and the cost can be reduced. Furthermore, in the case where the output portions are provided, when output from the electrochemical element stack is obtained, large output can be extracted from the output portion.

A configuration can be employed in which the distribution chamber is a space located on a lateral side of the electrochemical element stack relative to the electrochemical element stack in the housing, and an opening is formed on the space side and the flowing portion is in communication with the space through the opening.

That is, when the electrochemical element is allowed to function as a fuel cell (electrochemical power generating cell), for example, the second gas temporarily stays in a space located on a side (lateral side) on which the inlet or outlet of the flow portion of the electrochemical element stack in the housing, and then the second gas that stays in the space receives the second gas supply pressure and flows into the flowing portions. Accordingly, the second gas can flow equally in the flowing portions formed between the electrochemical elements.

A characteristic configuration of an electrochemical device of the present invention includes
at least the electrochemical element or the electrochemical module and a fuel converter, and includes a fuel supply unit that allows a reducing component gas to flow from the fuel converter to the electrochemical element or electrochemical module, or from the electrochemical element or electrochemical module to the fuel converter. The characteristic configuration may also include a power converter that extracts power from the electrochemical element or electrochemical module or supplies power to the electrochemical element or electrochemical module.

With the above-mentioned characteristic configuration, gas containing a reducing component can be supplied when a function of a fuel cell (electrochemical power generating cell) "that converts chemical energy such as fuel into electric energy" is performed, whereas gas containing a reducing component can be introduced into the fuel converter when a function of an electrolytic cell "that converts electric energy into chemical energy such as fuel" is performed.

That is, the electrochemical device includes the electrochemical module and the fuel converter and includes the fuel supply unit that allows the fuel gas containing a reducing component to flow into the electrochemical module. Therefore, in the case of operating the electrochemical reaction portion as a fuel cell, employing a configuration in which hydrogen is generated using a fuel converter such as a reformer from natural gas or the like supplied using an existing raw fuel supply infrastructure such as city gas makes it possible to extract power from an electrochemical module that has excellent durability, reliability, and performance and to realize an electrochemical device that has excellent durability, reliability, and performance. Also, it is easier to construct a system that recycles unused fuel gas that flows from the electrochemical module, thus making it possible to realize a highly efficient electrochemical device. In the case of operating the electrochemical reaction portion as an electrolytic cell, gas containing water vapor and carbon dioxide flows to an electrode layer, and a voltage is applied between the electrode layer and a counter electrode layer. As a result, in the electrode layer, electrons $e^-$ react with water molecules $H_2O$ and carbon dioxide molecules $CO_2$ to produce hydrogen molecules $H_2$, and carbon monoxide CO and oxygen ions $O^{2-}$. The oxygen ions $O^{2-}$ move to the counter electrode layer through the electrolyte layer. In the counter electrode layer, the oxygen ions $O^{2-}$ release electrons and oxygen molecules $O_2$ are produced. With the reactions above, water molecules $H_2O$ are electrolyzed into hydrogen molecules $H_2$ and oxygen molecules $O_2$, and in the case where gas containing carbon dioxide molecules $CO_2$ flows, carbon dioxide molecules $CO_2$ are electrolyzed into carbon monoxide CO and oxygen $O_2$.

In the case where gas containing water vapor and carbon dioxide molecules $CO_2$ flows, a fuel converter that synthesizes various compounds such as hydrocarbons from hydrogen, carbon monoxide, and the like generated through the above-mentioned electrolysis in the electrochemical reaction portion can be provided. With the fuel supply unit, hydrocarbon and the like produced by this fuel converter can flow to the electrochemical reaction portion or can be extracted from the system and the device and separately used as fuel or a raw chemical material.

The power converter extracts power generated by the electrochemical reaction portion or supplies power to the electrochemical reaction portion. Thus, as mentioned above, the electrochemical reaction portion serves as a fuel cell or an electrolytic cell. Accordingly, with the above-mentioned configuration, it is possible to provide an electrochemical element and the like that can improve the efficiency of converting chemical energy such as fuel into electric energy or can improve the efficiency of converting electric energy into chemical energy such as fuel.

A characteristic configuration of an energy system of the present invention includes the electrochemical device, and waste heat utilization system that reuses heat discharged from the electrochemical device or a fuel converter.

The above-mentioned characteristic configuration includes the electrochemical device and the waste heat utilization system that reuses heat discharged from the electrochemical device or the fuel converter, thus making it possible to realize an energy system that has excellent durability, reliability, and performance as well as excellent energy efficiency. It should be noted that it is also possible to realize a hybrid system that has excellent energy efficiency through combination of a power generation system that generates power with the use of combustion heat from unused fuel gas that flows from the electrochemical device.

Accordingly, it is possible to realize an electrochemical element stack that includes a small number of components and is easily produced using electrochemical elements having a structure that is easy to handle. In addition, an electrochemical module, an electrochemical device, and an energy system in which the electrochemical element stack is used can be provided at low cost.

DETAILED DESCRIPTION OF THE INVENTION

Figure 1:
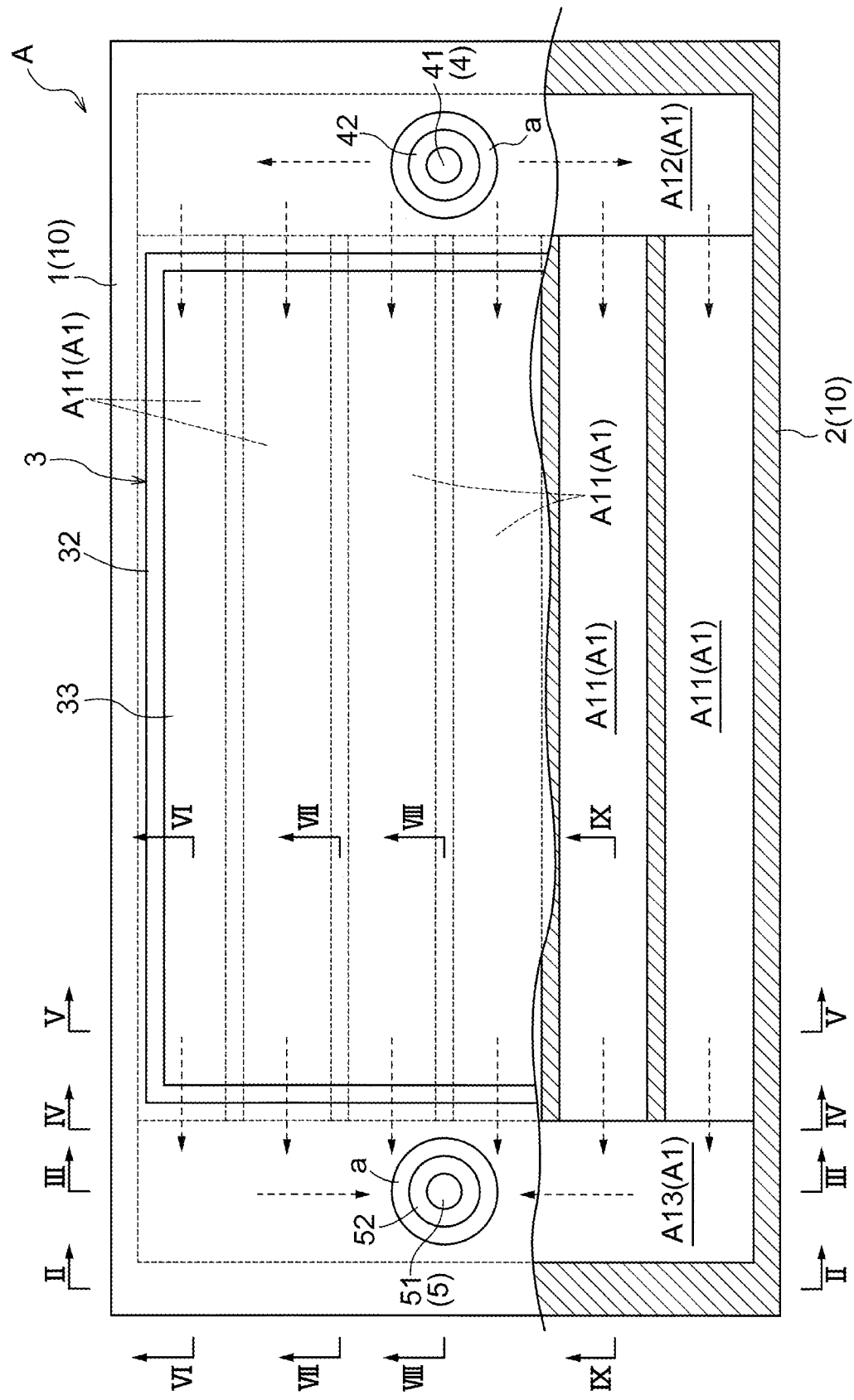
FIG. 1 is a schematic view of an electrochemical element.
Figure 2:
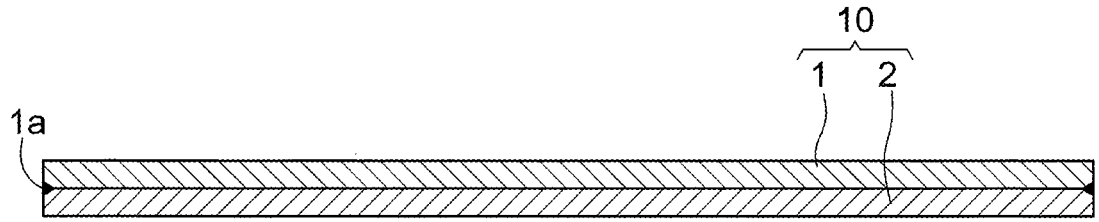
FIG. 2 is a cross-sectional view taken along line II-II in FIG. 1.
Figure 3:
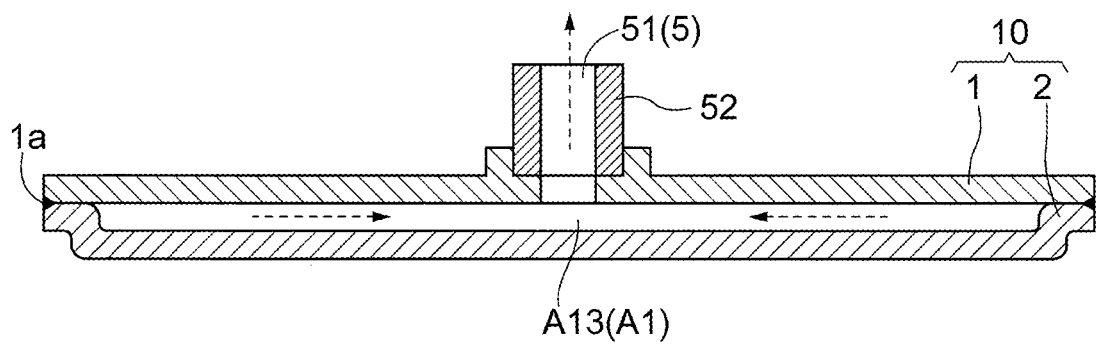
FIG. 3 is a cross-sectional view taken along line III-III in FIG. 1.
Figure 4:
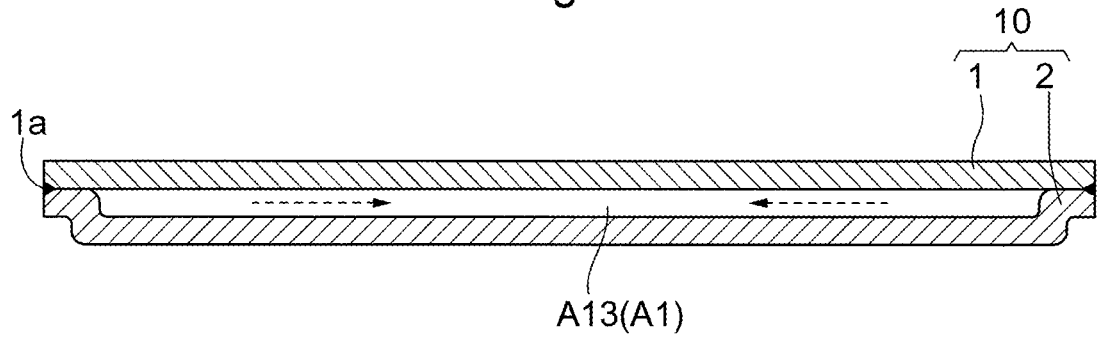
FIG. 4 is a cross-sectional view taken along line IV-IV in FIG. 1.

Hereinafter, an electrochemical element stack, an electrochemical element, an electrochemical module, an electrochemical device, and an energy system of the present invention will be described. Although preferred embodiments will be described below, each of these embodiments is described for more specifically illustrating the present invention. Various modifications may be made without departing from the scope and spirit of the invention, and the present invention is not limited to the following description.

Hereinafter, an electrochemical element stack, an electrochemical element, an electrochemical module, an electrochemical device, and an energy system of the present invention will be described with reference to FIGS. 1 to 10. It should be noted that when the positional relationship between layers and the like are described, an electrolyte layer side is referred to as "upper portion" or "upper side", and a first plate-like body side is referred to as "lower portion" or "lower side", with respect to an electrode layer, for example.

Electrochemical Element

As shown in FIGS. 1 to 9, the electrochemical element A includes a plate-like support 10 provided with an internal passage A1 formed between the faces of a conductive first plate-like body 1 and a conductive second plate-like body 2 that are opposed to each other, wherein the plate-like support 10 includes a gas-permeable portion 1A through which gas is permeable between the internal passage A1, which is located inside the plate-like support 10, and the outside at one or more portions of the first plate-like body 1 and the second plate-like body 2 included in the plate-like support 10, and the electrochemical reaction portion 3 that entirely or partially covers the gas-permeable portion 1A and includes a film-like electrode layer 31, a film-like electrolyte layer 32 and a film-like counter electrode layer 33 in the stated order (see FIGS. 5 to 9). Moreover, a first penetrated portion 41 forming a supply passage 4 through which a first gas that is one of a reducing component gas such as fuel gas and an oxidative component gas such as air flows from the outside in the surface penetration direction to the internal passage A1 is provided at one end portion of the plate-like support 10, and a second penetrated portion 51 forming a discharge passage 5 through which the first gas that has flowed in the internal passage A1 flows to the outside of the plate-like support in the surface penetration direction is provided at the other end portion of the plate-like support 10 (see FIGS. 1, 3, 8, and 9; it is understood that the supply passage 4 and the like and the discharge passage 5 and the like are symmetrical to each other and have a similar structure).

Plate-Like Support

The first plate-like body 1 serves to maintain the strength of the electrochemical element A by supporting the electrochemical reaction portion 3 including the electrode layer 31, the electrolyte layer 32, and the counter electrode layer 33. A material that has excellent electron conductivity, thermal resistance, oxidation resistance, and corrosion resistance is used as the material of the first plate-like body 1. Examples thereof include ferrite-based stainless steel, austenite-based stainless steel, and a nickel-based alloy. In particular, an alloy containing chromium is favorably used. In this embodiment, the first plate-like body 1 is made of a Fe—Cr based alloy that contains Cr in an amount of 18 mass % or more and 25 mass % or less, but a Fe—Cr based alloy that contains Mn in an amount of 0.05 mass % or more, a Fe—Cr based alloy that contains Ti in an amount of 0.15 mass % or more and 1.0 mass % or less, a Fe—Cr based alloy that contains Zr in an amount of 0.15 mass % or more and 1.0 mass % or less, a Fe—Cr based alloy that contains Ti and Zr, a total content of Ti and Zr being 0.15 mass % or more and 1.0 mass % or less, and a Fe—Cr based alloy that contains Cu in an amount of 0.10 mass % or more and 1.0 mass % or less are particularly favorable.

The plate-like support 10 is formed by welding and integrating peripheral portions 1a of the second plate-like body 2 and the first plate-like body 1 in a state in which the second plate-like body 2 and the first plate-like body 1 are stacked (see FIGS. 2 to 9). The second plate-like body 2 may be divided into a plurality of portions with respect to the first plate-like body 1. On the contrary, the first plate-like body 1 may be divided into a plurality of portions with respect to the second plate-like body 2. Another means such as bonding or fitting can be employed as the integrating means instead of welding. Portions other than the peripheral portions 1a may be integrated as long as the internal passage can be formed separate from the outside.

The first plate-like body 1 has a plate shape as a whole. The first plate-like body 1 includes the gas-permeable portion 1A obtained by forming a large number of through holes 11 that penetrate the face on the front side and the face on the back side (see FIGS. 5 to 9). It should be noted that the through holes 11 can be formed in the first plate-like body 1 by, for example, laser processing or the like. The through holes 11 have a function of transmitting gas from the face on the back side of the first plate-like member 1 to the face on the front side thereof. It is preferable that the gas-permeable portion 1A is provided in a region of the first plate-like body 1 that is smaller than the region in which the electrode layer 31 is provided.

A metal oxide layer 12 (which will be described later: see FIG. 10) serving as a diffusion suppressing layer is provided on the surface of the first plate-like body 1. That is, the diffusion suppressing layer is formed between the first plate-like body 1 and the electrode layer 31, which will be described later. The metal oxide layer 12 is provided not only on the face of the first plate-like body 1 exposed to the outside but also the face (interface) that is in contact with the electrode layer 31. The metal oxide layer 12 can also be provided on the inner faces of the through holes 11. Element interdiffusion that occurs between the first plate-like body 1 and the electrode layer 31 can be suppressed due to this metal oxide layer 12. For example, when ferrite-based stainless steel containing chromium is used in the first plate-like body 1, the metal oxide layer 12 is mainly made of a chromium oxide. The metal oxide layer 12 containing the chromium oxide as the main component suppresses diffusion of chromium atoms and the like of the first plate-like body 1 to the electrode layer 31 and the electrolyte layer 32. The metal oxide layer 12 need only have such a thickness that allows both high-diffusion prevention and low electric resistance to be achieved.

The metal oxide layer 12 can be formed using various techniques, but it is favorable to use a technique of oxidizing the surface of the first plate-like body 1 to obtain a metal oxide. Also, the metal oxide layer 12 may be formed on the surface of the first plate-like body 1 by using a spray coating technique (a technique such as thermal spraying technique, an aerosol deposition technique, an aerosol gas deposition technique, a powder jet deposition technique, a particle jet deposition technique, or a cold spraying technique), a PVD technique such as a sputtering technique or PLD technique, or a CVD technique, or may be formed by plating and oxidation treatment. Furthermore, the metal oxide layer 12 may also contain a spinel phase that has high electrical conductivity, or the like.

When a ferrite-based stainless steel material is used to form the first plate-like body 1, its thermal expansion coefficient is close to that of YSZ (yttria-stabilized zirconia), GDC (gadolinium-doped ceria; also called CGO), or the like, which is used as the material of the electrode layer 31 and the electrolyte layer 32. Accordingly, even if low and high temperature cycling is repeated, the electrochemical element A is less likely to be damaged. Therefore, this is preferable due to being able to realize an electrochemical element A that has excellent long-term durability. It should be noted that the first plate-like body 1 is provided with a plurality of through holes 11 that penetrate the face on the front side and the face on the back side. It should be noted that the through holes 11 can be provided in the first plate-like body 1 through, for example, mechanical, chemical, or optical piercing processing. The through holes 11 have a function of transmitting gas from the face on the back side of the first plate-like body 1 to the face on the front side thereof. Porous metal can also be used to impart gas permeability to the first plate-like body 1. For example, a metal sintered body, a metal foam, or the like can also be used as the first plate-like body 1.

Figure 5:
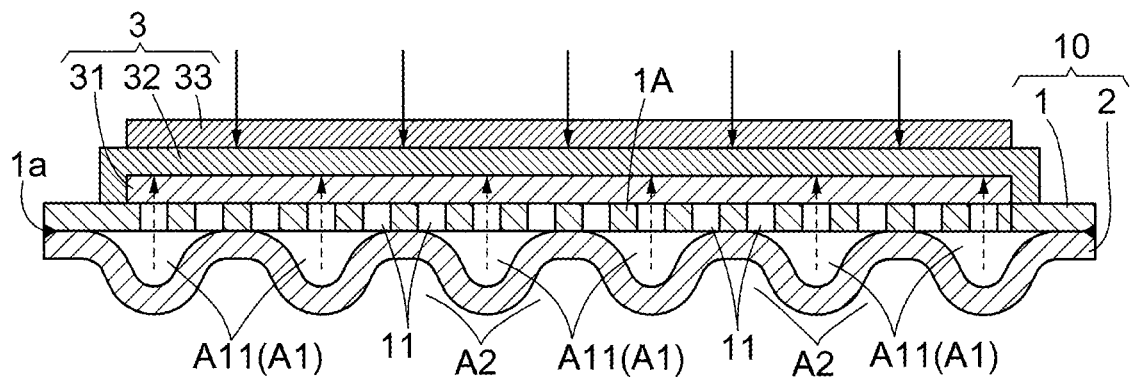
FIG. 5 is a cross-sectional view taken along line V-V in FIG. 1.
Figure 6:
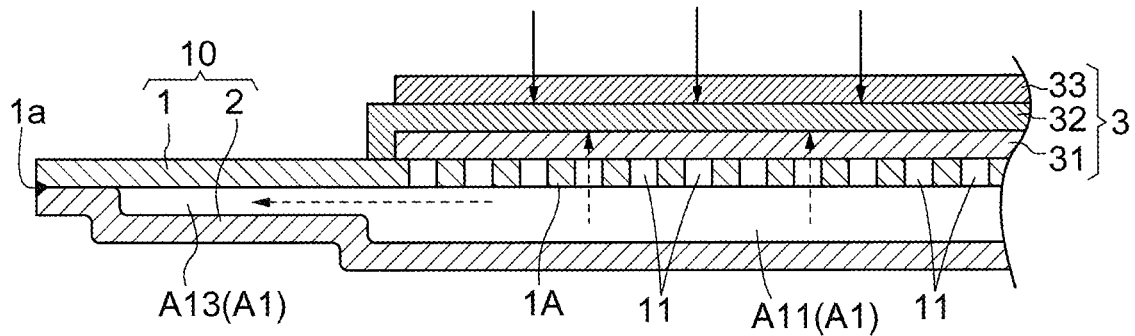
FIG. 6 is a cross-sectional view taken along line VI-VI in FIG. 1.
Figure 7:
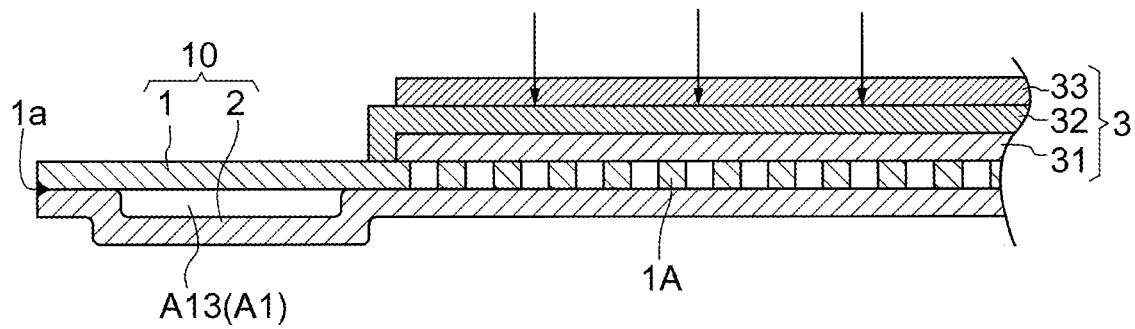
FIG. 7 is a cross-sectional view taken along line VII-VII in FIG. 1.
Figure 8:
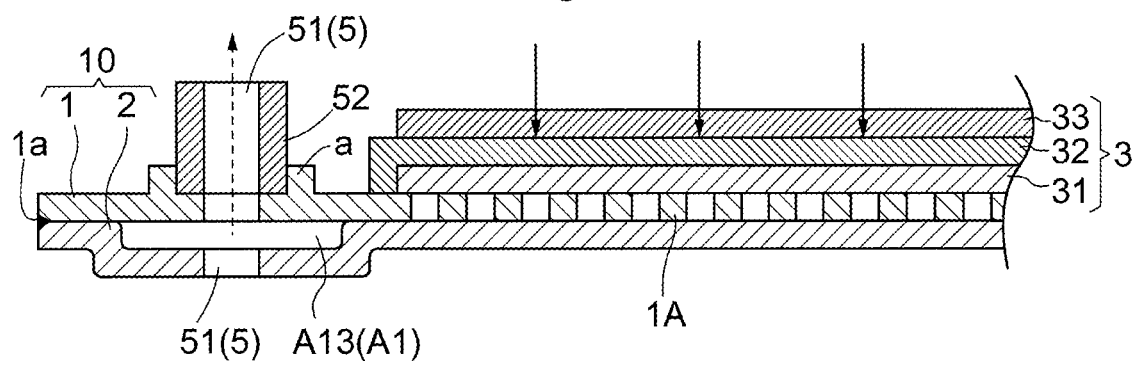
FIG. 8 is a cross-sectional view taken along line VIII-VIII in FIG. 1.
Figure 9:
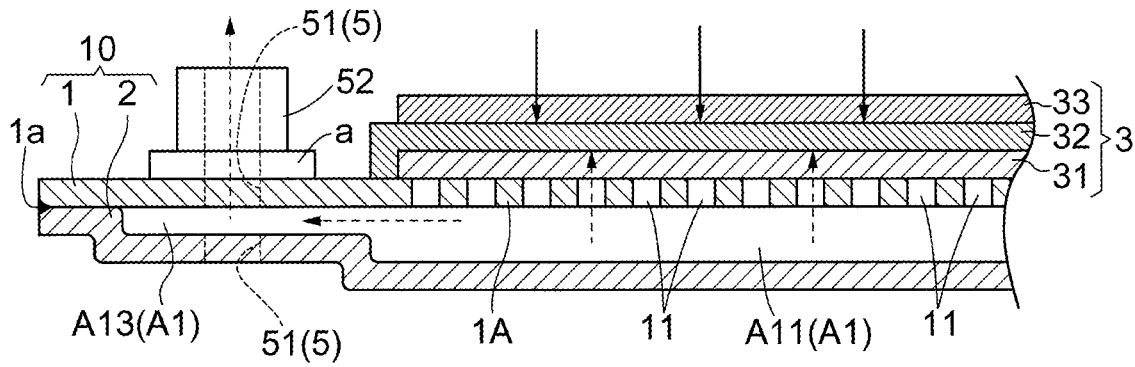
FIG. 9 is a cross-sectional view taken along line IX-IX in FIG. 1.

The second plate-like body 2 is formed in a wavelike shape such that the internal passage A1 including a plurality of auxiliary passages A11 leading from one end side to the other end side is formed in the region opposed to the gas-permeable portion 1A of the first plate-like body 1 (see FIGS. 1 and 5). Both faces on the front side and the back side of the second plate-like body 2 are formed in a wavelike shape. A face other than the face that delimits and forms the internal passage A1 is electrically connected to the electrochemical reaction portion 3 of the adjacent electrochemical element A, and passages formed near the portions of the wavelike second plate-like body 2 that are in contact with the first plate-like body 1 function as the flowing portion A2. The plurality of auxiliary passages A11 are provided extending in parallel along the long side of the rectangular plate-like support 10, and form the internal passage A1 extending from the supply passage 4 provided at one end portion to the discharge passage 5 provided at the other end portion. A connection portion where the first penetrated portion 41 and the internal passage A1 are connected to each other is provided with the distribution portion A12 that is formed by bulging the second plate-like body 2 downward from the portion thereof in contact with the first plate-like body 1 and distributes, to the auxiliary passages A11, a first gas that flows from the first penetrated portion 41 (see FIG. 1), and a connection portion where the second penetrated portion 51 and the internal passage A1 are connected to each other is provided with the confluence portion A13 that is formed by bulging the second plate-like body 2 downward from the portion thereof in contact with the first plate-like body 1, and collects the first gas that has flowed in the auxiliary passages A11 and introduces it into the second penetrated portion 51 (see FIGS. 1, 3, 4, and 6 to 9; it is understood that the supply passage 4 and the like and the discharge passage 5 and the like are symmetrical to each other and have a similar structure). The material of the second plate-like body is preferably a heat resistant metal, and more preferably the same material as that of the first plate-like body 1 from the viewpoint of reducing a difference in thermal expansion between the second plate-like body and the first plate-like body and ensuring the reliability of the joining state due to welding or the like.

Electrochemical Reaction Portion

Electrode Layer

As shown in FIGS. 5 to 10, the electrode layer 31 can be provided as a thin layer in a region that is larger than the region provided with the through holes 11, on the front face of the first plate-like body 1. When it is provided as a thin layer, the thickness can be set to, for example, approximately 1 μm to 100 μm, and preferably 5 μm to 50 μm. This thickness makes it possible to ensure sufficient electrode performance while also achieving cost reduction by reducing the amount of expensive electrode layer material that is used. The region provided with the through holes 11 is entirely covered by the electrode layer 31. That is, the through holes 11 are formed inside the region of the first plate-like body 1 in which the electrode layer 31 is formed. In other words, all the through holes 11 are provided facing the electrode layer 31.

The inside and the surface of the electrode layer 31 are provided with a plurality of pores in order to impart gas permeability to the electrode layer 31.

That is, the electrode layer 31 is formed as a porous layer. The electrode layer 31 is formed, for example, to have a denseness of 30% or more and less than 80%. Regarding the size of the pores, a size suitable for smooth progress of an electrochemical reaction can be selected as appropriate. It should be noted that the "denseness" is a ratio of the material of the layer to the space and can be represented by a formula "1−porosity", and is equivalent to relative density.

For example, a composite material such as NiO-GDC, Ni-GDC, NiO—YSZ, Ni—YSZ, $CuO\_CeO_2$, or $Cu\_CeO_2$ can be used as the material of the electrode layer 31. In these examples, GDC, YSZ, and $CeO_2$ can be called the aggregate of the composite material. It should be noted that it is preferable to form the electrode layer 31 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these processes that can be used in a low temperature range, a favorable electrode layer 31 is obtained, for example, without using calcining in a high temperature range of higher than 1100° C. Therefore, this is preferable due to being able to prevent damage to the first plate-like body 1, suppress element interdiffusion between the first plate-like body 1 and the electrode layer 31, and realize an electrochemical element A that has excellent durability. Furthermore, using low-temperature calcining makes it possible to facilitate handling of raw materials and is thus more preferable.

Intermediate Layer

An intermediate layer 34 can be formed as a thin layer on the electrode layer 31 so as to cover the electrode layer 31. When it is formed as a thin layer, the thickness can be set to, for example, approximately 1 µm to 100 µm, preferably approximately 2 µm to 50 µm, and more preferably approximately 4 µm to 25 µm. This thickness makes it possible to ensure sufficient performance while also achieving cost reduction by reducing the amount of expensive material of the intermediate layer 34 that is used. YSZ (yttria-stabilized zirconia), SSZ (scandia-stabilized zirconia), GDC (gadolinium-doped ceria), YDC (yttrium-doped ceria), SDC (samarium-doped ceria), or the like can be used as the material of the intermediate layer 34. In particular, ceria-based ceramics are favorably used.

It is preferable to form the intermediate layer 34 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Due to these film formation processes that can be used in a low temperature range, an intermediate layer 34 is obtained, for example, without using calcining in a high temperature range of higher than 1100° C. Therefore, it is possible to prevent damage to the first plate-like body 1, suppress element interdiffusion between the first plate-like body 1 and the electrode layer 31, and realize an electrochemical element A that has excellent durability. Furthermore, using low-temperature calcining makes it possible to facilitate handling of raw materials and is thus more preferable.

It is preferable that the intermediate layer 34 has oxygen ion (oxide ion) conductivity. It is more preferable that the intermediate layer 34 has both oxygen ion (oxide ion) conductivity and electron conductivity, namely mixed conductivity. The intermediate layer that has these properties is suitable for application to the electrochemical element A.

The electrode layer 31 may also be configured such that the content ratio of the aggregate of the cermet material, the denseness, and the strength are increased continuously from the lower side toward the upper side in the electrode layer 31. In this case, the electrode layer 31 need not include a region that can be clearly distinguished as a layer. However, even in this case, the content ratio of the aggregate of the cermet material, the denseness, the strength, and the like in a portion (upper portion) of the electrode layer 31 that is adjacent to the electrolyte layer 32 can also be increased compared with a portion (lower portion) of the electrode layer 31 that is adjacent to the first plate-like body 1.

Electrolyte Layer

As shown in FIGS. 5 to 10, the electrolyte layer 32 is formed as a thin layer on the intermediate layer so as to cover the electrode layer 31 and the intermediate layer 34. The electrolyte layer 32 can also be formed as a thin film having a thickness of 10 µm or less. Specifically, the electrolyte layer 32 is provided on both the intermediate layer 34 and the first plate-like body 1 (spanning the intermediate layer 34 and the first plate-like body 1). Configuring the electrolyte layer 32 in this manner and joining the electrolyte layer 32 to the first plate-like body 1 make it possible to allow the electrochemical element to have excellent toughness as a whole.

Figure 13:
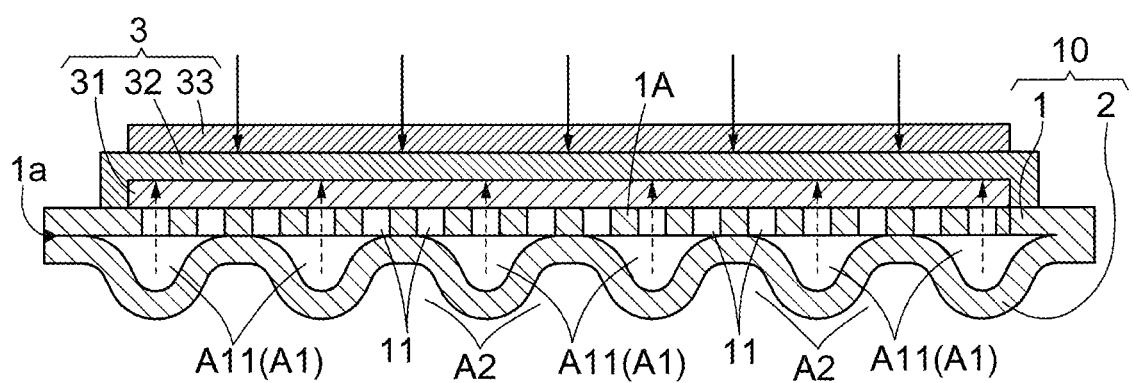
FIG. 13 is an explanatory diagram of an electrochemical module according to another embodiment.

Also, as shown in FIG. 13, the electrolyte layer 32 is provided in a region that is larger than the region provided with the through holes 11, on the front face of the first plate-like body 1. That is, the through holes 11 are formed inside the region of the first plate-like body 1 in which the electrolyte layer 32 is formed.

The leakage of gas from the electrode layer 31 and the above-mentioned intermediate layer (not shown) can be suppressed in the vicinity of the electrolyte layer 32. A description of this will be given. When the electrochemical element A is used as a constituent element of a SOFC, gas is supplied from the back side of the first plate-like body 1 through the through holes 11 to the electrode layer 31 during the operation of the SOFC. In a region where the electrolyte layer 32 is in contact with the first plate-like body 1, leakage of gas can be suppressed without providing another member such as a gasket. It should be noted that although the entire vicinity of the electrode layer 31 is covered by the electrolyte layer 32 in this embodiment, a configuration in which the electrolyte layer 32 is provided on the electrode layer 31 and the above-mentioned intermediate layer and a gasket or the like is provided in its vicinity may also be adopted.

Electrolyte materials having oxygen ion conductivity such as YSZ (yttria-stabilized zirconia), SSZ (scandia-stabilized zirconia), GDC (gadolinium-doped ceria), YDC (yttrium-doped ceria), SDC (samarium-doped ceria), LSGM (strontium- and magnesium-doped lanthanum gallate), and the like, and electrolyte materials having hydrogen ion conductivity such as perovskite oxides can be used as the material of the electrolyte layer 32. In particular, zirconia-based ceramics are favorably used. Using zirconia-based ceramics for the electrolyte layer 32 makes it possible to increase the operation temperature of the SOFC in which the electrochemical element A is used compared with the case where ceria-based ceramics and various materials having hydrogen ion conductivity are used. For example, when the electrochemical element A is used in the SOFC, by adopting a system configuration in which a material such as YSZ that can exhibit high electrolyte performance even in a high temperature range of approximately 650° C. or higher is used as the material of the electrolyte layer 32, a hydrocarbon-based raw fuel material such as city gas or LPG is used as the raw fuel for the system, and the raw fuel material is reformed into anode gas of the SOFC through steam reforming or the like, it is thus possible to construct a high-efficiency SOFC system in which heat generated in a cell stack of the SOFC is used to reform raw fuel gas.

It is preferable to form the electrolyte layer 32 using low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD (chemical vapor deposition) technique, or the like. Due to these film formation processes that can be used in a low temperature range, an electrolyte layer 32 that is dense and has high gas-tightness and gas barrier properties is obtained, for example, without using calcining in a high temperature range of higher than 1100° C. Therefore, it is possible to prevent damage to the first plate-like body 1, suppress element interdiffusion between the first plate-like body 1 and the electrode layer 31, and realize an electrochemical element A that has excellent performance and durability. In particular, using low-temperature calcining, a spray coating technique, or the like makes it possible to realize a low-cost element and is thus preferable. Furthermore, using a spray coating technique makes it easy to obtain, in a low temperature range, an electrolyte layer that is dense and has high gas-tightness and gas barrier properties, and is thus more preferable.

The electrolyte layer 32 is given a dense configuration in order to block gas leakage of anode gas and cathode gas and exhibit high ion conductivity. The electrolyte layer 32 preferably has a denseness of 90% or more, more preferably 95% or more, and even more preferably 98% or more. When the electrolyte layer 32 is formed as a uniform layer, the denseness is preferably 95% or more, and more preferably 98% or more. When the electrolyte layer 32 has a multilayer configuration, at least a portion thereof preferably includes a layer (dense electrolyte layer) having a denseness of 98% or more, and more preferably a layer (dense electrolyte layer) having a denseness of 99% or more. The reason for this is that an electrolyte layer that is dense and has high gas-tightness and gas barrier properties can be easily formed due to such a dense electrolyte layer being included as a portion of the electrolyte layer even when the electrolyte layer has a multilayer configuration.

Reaction Preventing Layer

A reaction preventing layer 35 can be formed as a thin layer on the electrolyte layer 32. When it is formed as a thin layer, the thickness can be set to, for example, approximately 1 μm to 100 μm, preferably approximately 2 μm to 50 μm, and more preferably approximately 3 μm to 15 μm. This thickness makes it possible to ensure sufficient performance while also achieving cost reduction by reducing the amount of expensive reaction preventing layer material that is used. The material of the reaction preventing layer need only be capable of preventing reactions between the component of the electrolyte layer 32 and the component of the counter electrode layer 33. For example, a ceria-based material or the like is used. Materials that contain at least one element selected from the group consisting of Sm, Gd, and Y are favorably used as the material of the reaction preventing layer 35. It is preferable that at least one element selected from the group consisting of Sm, Gd, and Y is contained, and the total content of these elements is 1.0 mass % or more and 10 mass % or less. Introducing the reaction preventing layer 35 between the electrolyte layer 32 and the counter electrode layer 33 effectively suppresses reactions between the material constituting the counter electrode layer 33 and the material constituting the electrolyte layer 32 and makes it possible to improve long-term stability in the performance of the electrochemical element A. Forming the reaction preventing layer 35 using, as appropriate, a method through which the reaction preventing layer 35 can be formed at a treatment temperature of 1100° C. or lower makes it possible to suppress damage to the first plate-like body 1, suppress element interdiffusion between the first plate-like body 1 and the electrode layer 31, and realize an electrochemical element A that has excellent performance and durability, and is thus preferable. For example, the reaction preventing layer 35 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

Counter Electrode Layer

As shown in FIGS. 5 to 10, the counter electrode layer 33 can be formed as a thin layer on the electrolyte layer 32 or the reaction preventing layer 35. When it is formed as a thin layer, the thickness can be set to, for example, approximately 1 μm to 100 μm, and preferably approximately 5 μm to 50 μm. This thickness makes it possible to ensure sufficient electrode performance while also achieving cost reduction by reducing the amount of expensive counter electrode layer material that is used. For example, a complex oxide such as LSCF or LSM, or a ceria-based oxide, or a mixture thereof can be used as the material of the counter electrode layer 33, for example. In particular, it is preferable that the counter electrode layer 33 includes a perovskite oxide containing two or more elements selected from the group consisting of La, Sr, Sm, Mn, Co, and Fe. The counter electrode layer 33 constituted by the above-mentioned material functions as a cathode.

It should be noted that forming the counter electrode layer 33 using, as appropriate, a method through which the counter electrode layer 33 can be formed at a treatment temperature of 1100° C. or lower makes it possible to suppress damage to the first plate-like body 1, suppress element interdiffusion between the first plate-like body 1 and the electrode layer 31, and realize an electrochemical element A that has excellent performance and durability, and is thus preferable. For example, the counter electrode layer 33 can be formed using, as appropriate, low-temperature calcining (not performing calcining treatment in a high temperature range of higher than 1100° C., but rather performing a wet process using calcining treatment in a low temperature range, for example), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. In particular, using low-temperature calcining, a spray coating technique, or the like makes it possible to realize a low-cost element and is thus preferable. Furthermore, using low-temperature calcining makes it possible to facilitate handling of raw materials and is thus more preferable.

For example, in the electrochemical reaction portion 3 configured as described above, fuel gas containing hydrogen serving as a first gas flows from the back face of the first plate-like body 1 through the through holes 11 to the electrode layer 31, air serving as a second gas flows to the counter electrode layer 33 serving as a counter electrode of the electrode layer 31, and the operation temperature is kept at temperature of, for example, 500° C. or higher and 900° C. or lower. In this case, when the electrolyte layer 32 is made of an electrolyte material having oxygen ion conductivity, oxygen $O_2$ included in air reacts with electrons $e^-$ in the counter electrode layer 33, thus producing oxygen ions $O^{2-}$. The oxygen ions $O^{2-}$ move to the electrode layer 31 through the electrolyte layer 32. In the electrode layer 31, the hydrogen $H_2$ included in the fuel gas that has flowed reacts with the oxygen ions $O^{2-}$, thus producing water $H_2O$ and electrons $e^-$. When the electrolyte layer 32 is made of an electrolyte material having hydrogen ion conductivity, hydrogen $H_2$ included in the fuel gas that has flowed releases electrons $e^-$ in the electrode layer 31, thus producing hydrogen ions $H^+$. The hydrogen ions $H^+$ move to the counter electrode layer 33 through the electrolyte layer 32. In the counter electrode layer 33, oxygen $O_2$ included in air, hydrogen ions $H^+$, and electrons $e^-$ react with each other to produce water $H_2O$. With these reactions, electromotive force is generated as electrochemical output between the electrode layer 31 and the counter electrode layer 33. In this case, the electrode layer 31 functions as a fuel electrode (anode) of the fuel cell, and the counter electrode layer 33 functions as an air electrode (cathode).

Figure 10:
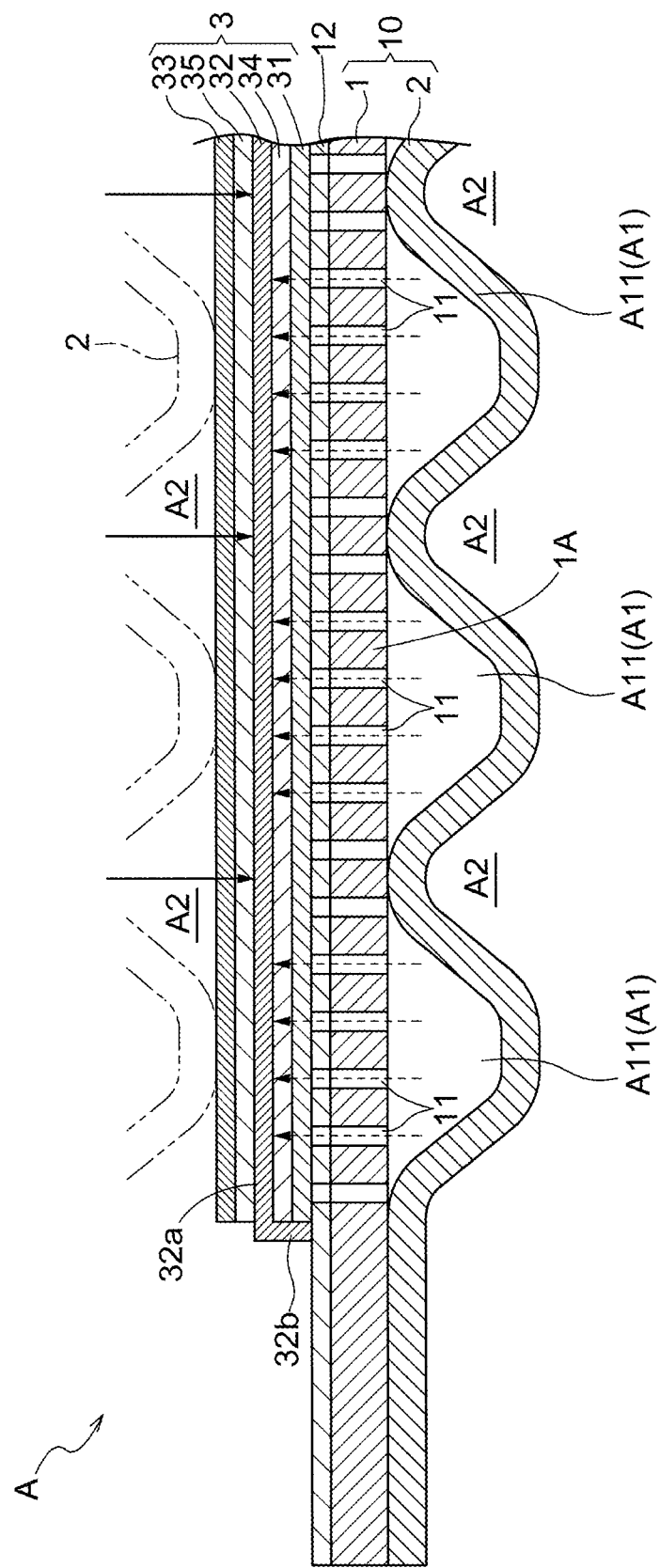
FIG. 10 is an enlarged view of a relevant portion of an electrochemical reaction portion.

Although omitted in FIGS. 5 to 9, the electrochemical reaction portion 3 of this embodiment is provided with the intermediate layer 34 between the electrode layer 31 and the electrolyte layer 32 as shown in FIG. 10. Furthermore, the reaction preventing layer 35 is provided between the electrolyte layer 32 and the counter electrode layer 33.

Method for Manufacturing Electrochemical Reaction Portion

Next, a method for manufacturing the electrochemical reaction portion 3 will be described. It should be noted that the description will be given mainly with reference to FIG. 10 since the intermediate layer 34 and the reaction preventing layer 35 are omitted in FIGS. 5 to 9.

Electrode Layer Forming Step

In an electrode layer forming step, the electrode layer 31 is formed as a thin film in a region that is broader than the region provided with the through holes 11, on the front face of the first plate-like body 1. The through holes 11 of the first plate-like body 1 can be provided through laser processing or the like. As described above, the electrode layer 31 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

The following is a specific example of the case where low-temperature calcining is performed as the electrode layer forming step. First, a material paste is produced by mixing powder of the material of the electrode layer 31 and a solvent (dispersion medium), and is applied to the front face of the first plate-like body 1. Then, calcining is performed at a temperature of 800° C. to 1100° C.

Diffusion Suppressing Layer Forming Step

The metal oxide layer 12 (diffusion suppressing layer) is formed on the surface of the first plate-like body 1 during the calcining step in the above-described electrode layer forming step. It should be noted that it is preferable that the above-mentioned calcining step includes a calcining step in which the calcining atmosphere satisfies the atmospheric condition that the oxygen partial pressure is low because a high-quality metal oxide layer 12 (diffusion suppressing layer) that has a high element interdiffusion suppressing effect and has a low resistance value is formed. In a case where a coating method that does not include calcining is performed as the electrode layer forming step, for example, a separate diffusion suppressing layer forming step may also be included. In any case, it is desirable to perform these steps at a temperature of 1100° C. or lower such that damage to the first plate-like body 1 can be suppressed.

Intermediate Layer Forming Step

In an intermediate layer forming step, the intermediate layer 34 is formed as a thin layer on the electrode layer 31 so as to cover the electrode layer 31. As described above, the intermediate layer 34 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

The following is a specific example of the case where low-temperature calcining is performed as the intermediate layer forming step.

First, a material paste is produced by mixing powder of the material of the intermediate layer 34 and a solvent (dispersion medium), and is applied to the front face of the first plate-like body 1. Then, the intermediate layer 34 is obtained through compression molding (intermediate layer smoothing step) and calcining at a temperature of 1100° C. or lower (intermediate layer calcining step). Examples of rolling of the intermediate layer 34 include CIP (Cold Isostatic Pressing) molding, roll pressing molding, and RIP (Rubber Isostatic Pressing) molding. It is favorable to perform calcining of the intermediate layer 34 at a temperature of 800° C. or higher and 1100° C. or lower. The reason for this is that this temperature makes it possible to form an intermediate layer 34 that has high strength while suppressing damage to and deterioration of the first plate-like body 1. It is more preferable to perform calcining of the intermediate layer 34 at a temperature of 1050° C. or lower, and more preferably 1000° C. or lower. The reason for this is that the lower the calcining temperature of the intermediate layer 34 is, the more likely it is to further suppress damage to and deterioration of the first plate-like body 1 when forming the electrochemical element A. The order in which the intermediate layer smoothing step and the intermediate layer calcining step are performed can be changed.

It should be noted that lapping molding, leveling treatment, surface cutting treatment, surface polishing treatment, or the like can also be performed as the intermediate layer smoothing step.

Electrolyte Layer Forming Step

In an electrolyte layer forming step, the electrolyte layer 32 is formed as a thin layer on the intermediate layer 34 so as to cover the electrode layer 31 and the intermediate layer 34. The electrolyte layer 32 may also be formed as a thin film having a thickness of 10 μm or less. As described above, the electrolyte layer 32 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

It is desirable to perform a spray coating technique as the electrolyte layer forming step in order to form a high-quality electrolyte layer 32 that is dense and has high gas-tightness and gas barrier properties in a temperature range of 1100° C. or lower. In this case, the material of the electrolyte layer 32 is sprayed onto the intermediate layer 34 on the first plate-like body 1, and the electrolyte layer 32 is thus formed.

Reaction Preventing Layer Forming Step

In a reaction preventing layer forming step, the reaction preventing layer 35 is formed as a thin layer on the electrolyte layer 32. As described above, the reaction preventing layer 35 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1. It should be noted that, for example, leveling treatment, surface cutting treatment, or surface polishing treatment may be performed after the formation of the reaction preventing layer 35, or pressing processing may be performed after wet formation and before calcining, in order to flatten the top face of the reaction preventing layer 35.

Counter Electrode Layer Forming Step

In a counter electrode layer forming step, the counter electrode layer 33 is formed as a thin layer on the reaction preventing layer 35. As described above, the counter electrode layer 33 can be formed using low-temperature calcining (a wet process using calcining treatment in a low temperature range of 1100° C. or lower), a spray coating technique (a technique such as a thermal spraying technique, an aerosol deposition technique, an aerosol gas deposition technique, a powder jet deposition technique, a particle jet deposition technique, or a cold spraying technique), a PVD technique (e.g., a sputtering technique or a pulse laser deposition technique), a CVD technique, or the like. Regardless of which technique is used, it is desirable to perform the technique at a temperature of 1100° C. or lower in order to suppress deterioration of the first plate-like body 1.

In this manner, the electrochemical reaction portion 3 can be manufactured.

It should be noted that a configuration in which the electrochemical reaction portion 3 does not include both or either of the intermediate layer 34 and the reaction preventing layer 35 is also possible. That is, a configuration in which the electrode layer 31 and the electrolyte layer 32 are in contact with each other, or a configuration in which the electrolyte layer 32 and the counter electrode layer 33 are in contact with each other is also possible. In this case, in the above-described manufacturing method, the intermediate layer forming step and the reaction preventing layer forming step are omitted. It should be noted that it is also possible to add a step of forming another layer or to form a plurality of layers of the same type one on top of another, but in any case, it is desirable to perform these steps at a temperature of 1100° C. or lower.

Electrochemical Element Stack

Figure 11:
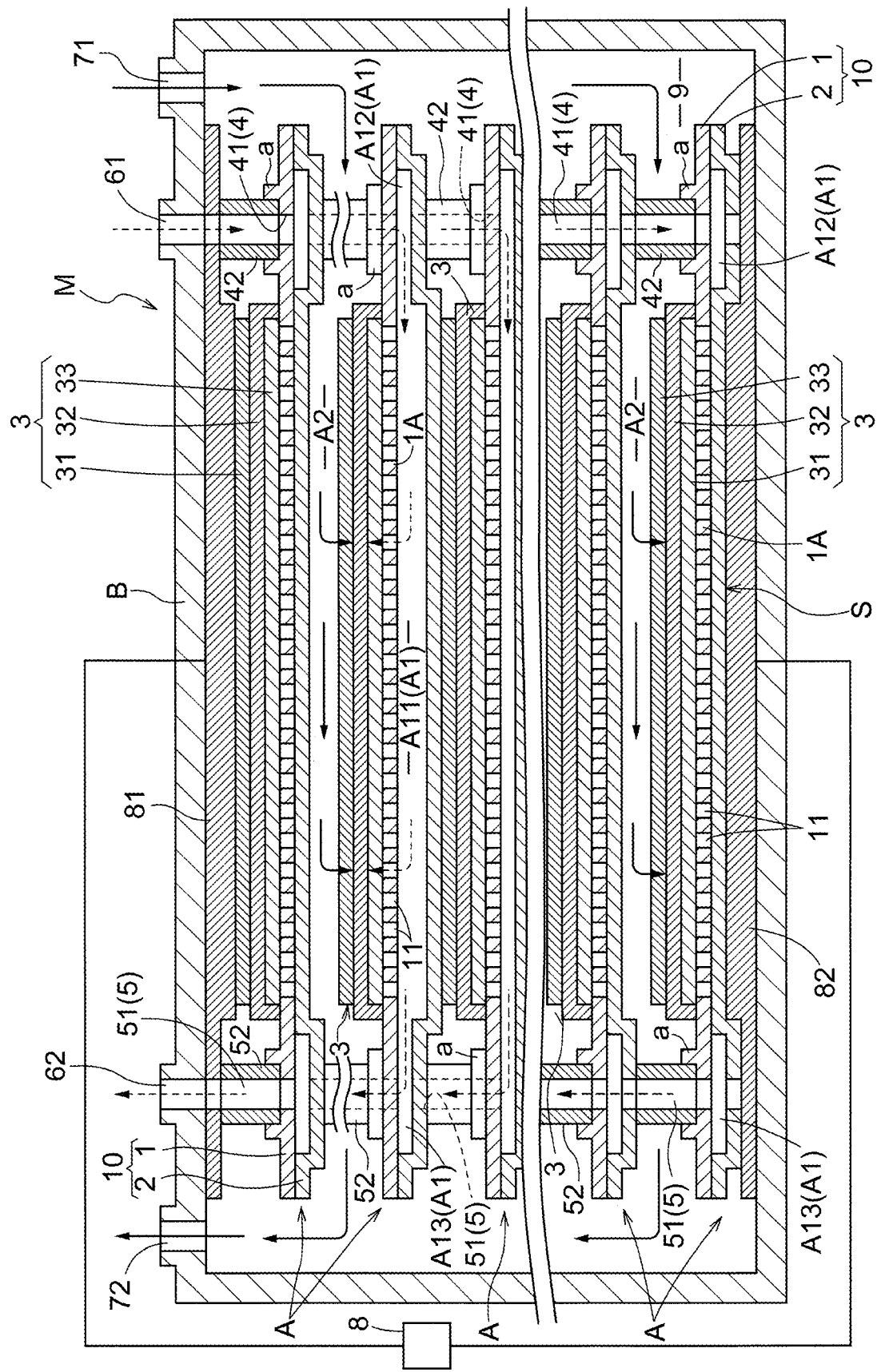
FIG. 11 is a schematic view of an electrochemical module.

As shown in FIG. 11, the electrochemical element stack S includes a plurality of electrochemical elements A, and the electrochemical elements A are stacked and arranged such that the plate-like support 10 included in one of the adjacent electrochemical elements A is opposed to the plate-like support 10 included in the other, the outer face of the second plate-like body 2, which is different from the first plate-like body 1 on which the electrochemical reaction portion 3 is arranged, in the plate-like support 10 included in one of the adjacent electrochemical elements A is electrically connected to the outer face of the first plate-like body 1 in the plate-like support 10 included in the other, and the flowing portion A2 through which the second gas flows along the two outer faces is formed between the two outer faces. As a method for electrically connecting the two outer faces, a method for simply bringing electroconductive surfaces into contact with each other, a method for applying contact pressure to the contact faces, a method for reducing contact resistance by providing a highly electroconductive material therebetween, or the like can be employed. Specifically, the above-mentioned configuration is obtained by lining up the rectangular electrochemical elements in the state in which the first penetrated portions 41 at one end and the second penetrated portions 51 at the other end are respectively aligned and the electrochemical reaction portions of the electrochemical elements face upward, and stacking the electrochemical elements with the first annular sealing portions being provided between the first penetrated portions 41 and the second annular sealing portions being provided between the second penetrated portions 51.

In the plate-like support 10, the first penetrated portion 41 forming the supply passage 4 through which a first gas that is one of a reducing component gas and an oxidative component gas flows from the outside in the surface penetration direction to the internal passage A1 is provided at one end in the longitudinal direction of the rectangular plate-like support 10, the first annular sealing portion 42 serving as an annular sealing portion for separating the first penetrated portion 41 that is formed on each of the two outer faces of the plate-like member 10 from the flowing portion A2 is provided in the flowing portion A2, and the supply passage 4 through which the first gas flows to the internal passage A1 is formed by the first penetrated portion 41 and the first annular sealing portion 42. It should be noted that an annular bulging portion a is provided around a portion of the first plate-like body 1 with which the first annular sealing portion 42 is in contact, on a face of the first plate-like body 1 on a side other than the side on which the internal passage A1 is located, thus making it easy to position the first annular sealing portion 42 in the direction extending along the face of the first plate-like body 1.

Moreover, the other end side of the plate-like support 10 is provided with the second penetrated portion 51 forming the discharge passage 5 through which the first gas that has flowed in the internal passage A1 flows to the outside in the surface penetration direction of the plate-like support 10 is provided, the second penetrated portion 51 has a configuration in which the first gas flows therein in the state of being separated from the second gas, the second annular sealing portion 52 serving as an annular sealing portion for separating the second penetrated portion 51 that are formed on each of the two outer faces of the plate-like support 10 from the flowing portion A2 is provided in the flowing portion A2, and the discharge passage 5 into which the first gas that has flowed in the internal passage A1 flows is formed by the second penetrated portion 51 and the second annular sealing portion 52.

The first annular sealing portion 42 and the second annular sealing portion 52 are made of an insulating ceramics material such as alumina, metal covered by the insulating ceramics material, mica fibers, or glass, and function as insulating sealing portions that electrically insulate the adjacent electrical elements from each other.

Electrochemical Module

As shown in FIG. 11, an electrochemical module M includes: a housing B that is internally provided with the whole electrochemical element stack S; a first gas supply unit 61 through which a first gas flows from the outside of the housing B to internal passage A1 via a supply passage 4; a first gas discharge unit 62 through which the first gas used in a reaction flows; a second gas supply unit 71 through which a second gas flows from the outside of the housing B to flowing portions A2; a second gas discharge unit 72 through which the second gas used in a reaction flows; and an output portion 8 to which output generated by an electrochemical reaction in the electrochemical reaction portion 3 is provided, wherein a distribution chamber 9 in which the second gas that flows from the second gas supply unit 71 flows and is distributed to the flowing portions A2 is provided inside the housing B. The distribution chamber 9 is a space located on a side (lateral side) on which the inlet or outlet of the flow portion of the electrochemical element stack S with respect to the electrochemical element stack S, and openings are formed on the space side and the flowing portions A2 are in communication with the space therethrough.

In a state of being held between two collectors 81 and 82, the electrochemical element stack S is provided inside the housing B. The output portion 8 extends from the collectors 81 and 82 and is connected to a power supply target provided outside the housing B so as to freely supply power thereto. Furthermore, the collectors 81 and 82 are provided such that the electrochemical element stack S is housed in the housing B in a sealed manner and they function as cushioning members for the electrochemical elements A.

Accordingly, in the electrochemical module M, the fuel gas flows from the first gas supply unit 61 and air flows from the second gas supply unit 71, so that the fuel gas enters as indicated by dashed arrows and air enters as indicated by solid arrows as shown in FIG. 11. The fuel gas flowing from the first gas supply unit 61 is introduced into the supply passage 4 through a first penetrated portion 41 of the topmost electrochemical element A of the electrochemical element stack S, and flows from the supply passage 4 partitioned by first annular sealing portions 42 into the internal passages A1 in all of the electrochemical elements A. Moreover, the air flowing from the second gas supply unit 71 temporarily flows into the distribution chamber 9, and then flows into the flowing portions A2 formed between the electrochemical elements A.

Incidentally, when the second plate-like body 2 is considered as a base, the internal passage A1 is formed between the first plate-like body 1 and the second plate-like body 2 at a position at which a portion of the second plate-like body 2 with a wavelike plate-like shape bulges from the first plate-like body 1, and such a portion comes into contact with the electrochemical reaction portion 3 of the adjacent electrochemical element A and can be electrically connected thereto. On the other hand, a portion of the second plate-like body 2 with a wavelike plate-like shape that is in contact with the first plate-like body 1 is electrically connected to the first plate-like body 1, and the flowing portion A2 is formed between the second plate-like body 2 and the electrochemical reaction portion 3 of the adjacent electrochemical element A.

A portion of FIG. 10 shows a cross section of an electrochemical element A including the internal passage A1 and a cross section of an electrochemical element A including the flowing portion A2 that are aligned for the sake of convenience. The fuel gas flowing from the first gas supply unit 61 reaches a distribution portion A12 (see FIGS. 1, 4, and 7), flows and spreads in the width direction of one end portion via the distribution portion A12, and reaches the auxiliary passages A11 of the internal passage A1 (see FIGS. 1, 3, and 7). Then, the fuel gas that has entered the internal passage A1 can enter the electrode layers 31 via the gas-permeable portions 1A. Moreover, the fuel gas further flows in the internal passage A1 together with the fuel gas used in an electrochemical reaction to the discharge passage 5 formed by second annular sealing portions 52 via the confluence portions A13 and the second penetrated portion 51, and is discharged from the first gas discharge unit 62 to the outside of the housing B, together with the fuel gas that was used in an electrochemical reaction and flows from other electrochemical elements A. On the other hand, the air flowing from the second gas supply unit 71 enters the flowing portions A2 via the distribution chamber 9, and then can enter the counter electrode layers 33. Moreover, the air further flows in the flowing portions A2 along the electrochemical reaction portions 3 together with air used in an electrochemical reaction, and is discharged from the second gas discharge unit 72 to the outside of the housing B.

With this configuration, the electrochemical elements A are connected in series between the collectors 81 and 82 due to the contact between the second plate-like body 2 and the electrochemical reaction portion 3 of the adjacent electrochemical elements A, and thus power generated following the fuel gas flow and the air flow in the electrochemical reaction portions 3 is extracted from the output portion 8 as composite output.

The electrochemical module M as described above can be used to construct an electrochemical device 100 and an energy system Z.

Energy System, Electrochemical Device

Figure 12:
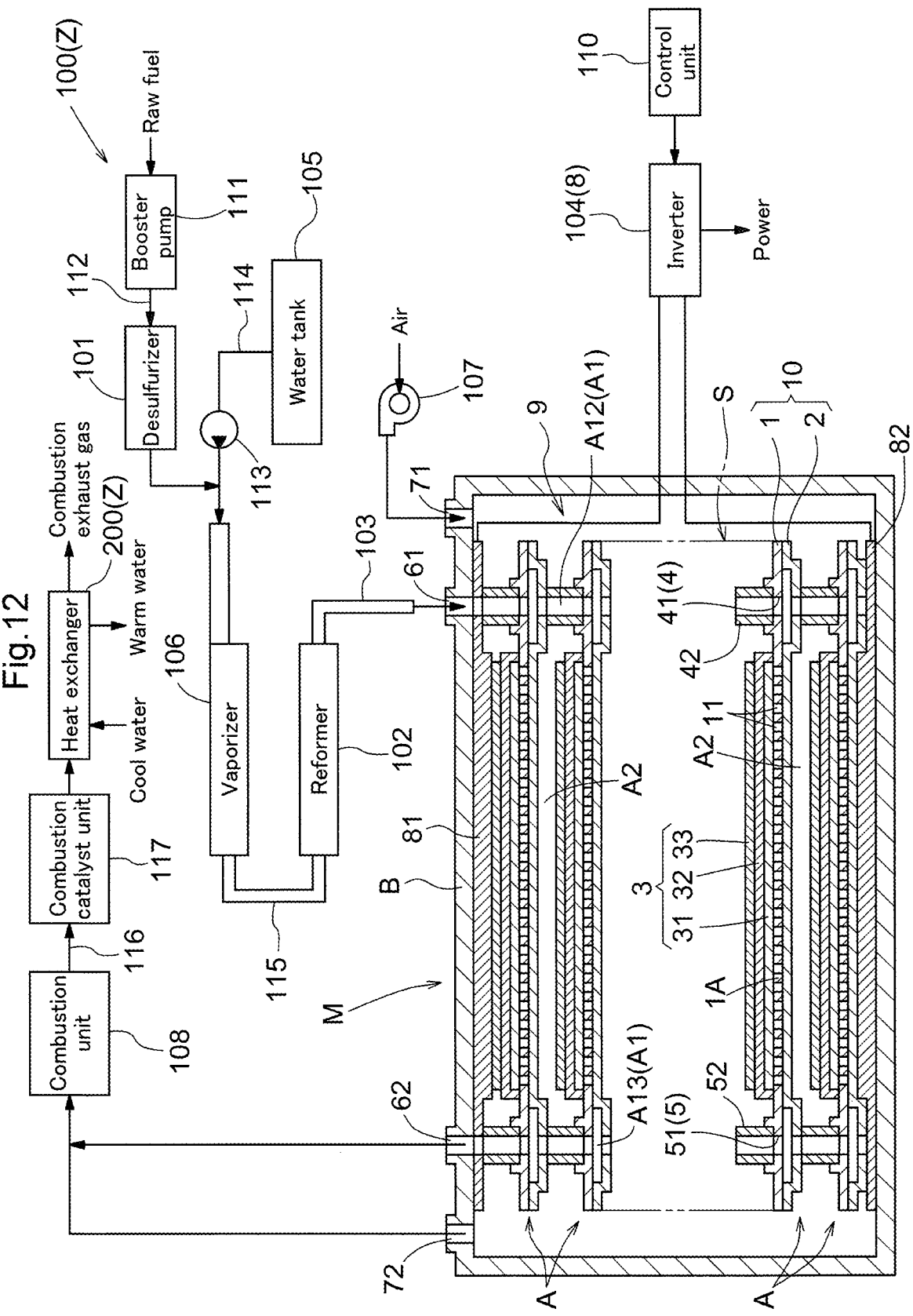
FIG. 12 is a schematic view of an energy system.

FIG. 12 shows an overview of the energy system Z and the electrochemical device 100.

The energy system Z includes the electrochemical device 100, and a heat exchanger 200 serving as a waste heat utilization system that reuses heat flowing from the electrochemical device 100.

The electrochemical device 100 includes the electrochemical module M, a desulfurizer 101, and a reformer 102 that is one type of fuel converter, and includes a fuel supply unit 103 from which fuel gas containing a reducing component flows to the electrochemical module M, and an inverter 104 that is one type of power converter and serves as the output portion 8 for extracting power from the electrochemical module M.

Specifically, the electrochemical device 100 includes the desulfurizer 101, a water tank 105, a vaporizer 106, the reformer 102, a blower 107, a combustion unit 108, the inverter 104, a control unit 110, and the electrochemical module M.

The desulfurizer 101 removes sulfur compound components contained in a hydrocarbon-based raw fuel such as city gas (i.e., performs desulfurization). When a sulfur compound is contained in the raw fuel, the inclusion of the desulfurizer 101 makes it possible to suppress an adverse influence that the sulfur compound has on the reformer 102 or the electrochemical elements A. The vaporizer 106 produces water vapor (steam) from water supplied from the water tank 105. The reformer 102 uses the water vapor (steam) produced by the vaporizer 106 to perform steam reforming of the raw fuel desulfurized by the desulfurizer 101, thus producing reformed gas containing hydrogen.

The electrochemical module M generates power by causing an electrochemical reaction to occur with use of the reformed gas flowing from the reformer 102 and air flowing from the blower 107. The combustion unit 108 mixes the reaction exhaust gas flowing from the electrochemical module M with air, and burns combustible components in the reaction exhaust gas.

The inverter 104 adjusts the power output from the electrochemical module M to obtain the same voltage and frequency as power received from a commercial system (not shown). The control unit 110 controls the operation of the electrochemical device 100 and the energy system Z.

The reformer 102 performs reforming process on the raw fuel with use of combustion heat produced by the combustion of reaction exhaust gas in the combustion unit 108.

The raw fuel flows to the desulfurizer 101 via a raw fuel supply passage 112, due to the operation of a booster pump 111. The water in the water tank 105 flows to the vaporizer 106 via a water supply passage 114, due to the operation of a water pump 113. The raw fuel supply passage 112 merges with the water supply passage 114 at a location on the downstream side of the desulfurizer 101, and the water and the raw fuel, which have been merged outside of the housing B, flow to the vaporizer 106.

The water is vaporized by the vaporizer 106 to produce water vapor. The raw fuel, which contains the water vapor produced by the vaporizer 106, flows to the reformer 102 via a water vapor-containing raw fuel supply passage 115. In the reformer 102, the raw fuel is subjected to steam reforming, thus producing reformed gas that includes hydrogen gas as a main component (first gas including a reducing component). The reformed gas produced in the reformer 102 flows to the electrochemical module M via the fuel supply unit 103.

The reaction exhaust gas is burned in the combustion unit 108, and combustion exhaust gas is sent from a combustion exhaust gas discharge passage 116 to the heat exchanger 200. A combustion catalyst unit 117 (e.g., a platinum-based catalyst) is provided in the combustion exhaust gas discharge passage 116, and reducing components such as carbon monoxide and hydrogen contained in the combustion exhaust gas are removed by combustion.

The heat exchanger 200 uses cool water flowing therein to perform heat exchange on the combustion exhaust gas produced by combustion in the combustion unit 108, thus producing warm water. In other words, the heat exchanger 200 operates as a waste heat utilization system that reuses heat discharged from the electrochemical device 100.

It should be noted that instead of the waste heat utilization system, it is possible to provide a reaction exhaust gas using unit that uses the reaction exhaust gas flowing from (not burned in) the electrochemical module M. At least a portion of the reaction exhaust gas flowing from the first gas discharge unit 62 to the outside of the housing B may be returned to one of the members 100, 101, 103, 106, 112, 113, and 115 shown in FIG. 12 and recycled. The reaction exhaust gas contains remaining hydrogen gas that was not used in the reaction in the electrochemical elements A. In the reaction exhaust gas using unit, the remaining hydrogen gas is used to perform heat utilization through combustion or power generation by a fuel cell and so on, thus achieving effective energy utilization.

Figure 32:
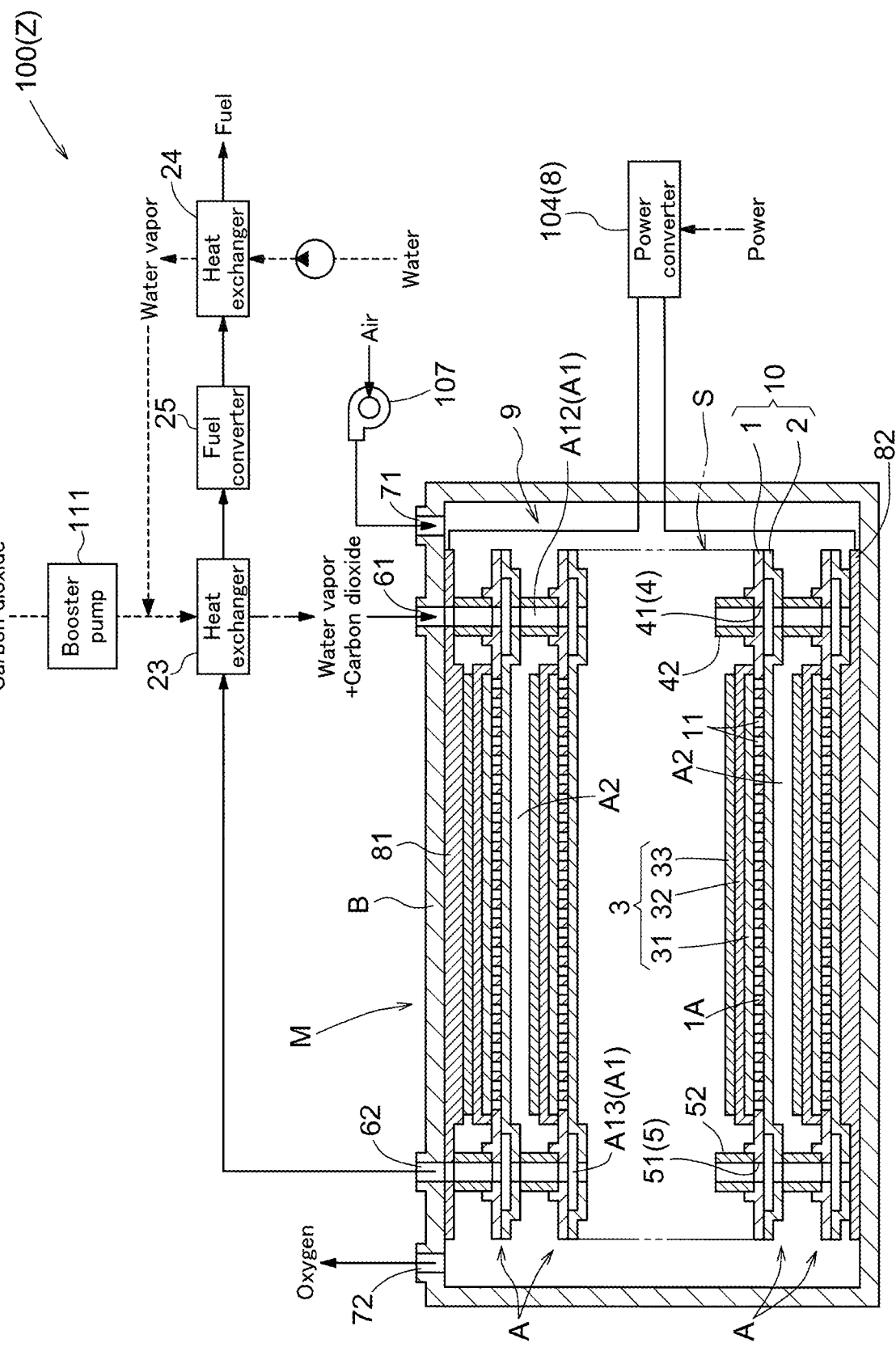
FIG. 32 is a schematic view of another energy system.

FIG. 32 shows examples of the energy system Z and the electrochemical device 100 in the case where the electrochemical reaction portions 3 are operated as electrolytic (electrolysis) cells. In this system, supplied water and carbon dioxide are electrolyzed in the electrochemical reaction portion 3 to produce hydrogen, carbon monoxide, and the like. Furthermore, in the fuel converter 25, hydrocarbons and the like are synthesized. By employing the configuration in which the heat exchanger 24 shown in FIG. 32 is operated as a waste heat utilization system that performs heat exchange between the water and the reaction heat produced by the reaction in the fuel converter 25 to vaporize the water, and the heat exchanger 23 shown in FIG. 32 is operated as a waste heat utilization system that performs heat exchange between water vapor and carbon dioxide, and waste heat produced by the electrochemical elements A to preheat the water vapor and the carbon dioxide, the energy efficiency can be improved.

Moreover, a power converter 104 (converter) supplies power to the electrochemical elements A. Accordingly, as mentioned above, the electrochemical elements A function as electrolytic cells.

Therefore, with the above-mentioned configuration, an electrochemical device 100, an energy system Z, and the like that can improve the efficiency of converting electric energy into chemical energy such as fuel can be provided.

Other Embodiments (1) Although the electrochemical elements A are used in a solid oxide fuel cell serving as the electrochemical device 100 in the embodiments described above, the electrochemical elements A can also be used in a solid oxide electrolytic cell, an oxygen sensor using a solid oxide, and the like. The electrochemical elements A can also be used alone as well as used in combination of two or more for the electrochemical element stack S or the electrochemical module M.

(2) In the embodiments described above, a composite material such as $NiO\_GDC$, $Ni\_GDC$, $NiO\_YSZ$, $Ni\_YSZ$, $CuO\_CeO_2$, or $Cu\_CeO_2$ is used as the material of the electrode layer 31, and a complex oxide such as LSCF or LSM is used as the material of the counter electrode layer 33. With this configuration, the electrode layer 31 serves as a fuel electrode (anode) when hydrogen gas flows thereto, and the counter electrode layer 33 serves as an air electrode (cathode) when air flows thereto, thus making it possible to use the electrochemical element A as a cell for a solid oxide fuel cell. It is also possible to change this configuration and thus configure an electrochemical element A such that the electrode layer 31 can be used as an air electrode and the counter electrode layer 33 can be used as a fuel electrode. That is, a complex oxide such as LSCF or LSM is used as the material of the electrode layer 31, and a composite material such as $NiO\_GDC$, $Ni\_GDC$, $NiO\_YSZ$, $Ni\_YSZ$, $CuO\_CeO_2$, or $Cu\_CeO_2$ is used as the material of the counter electrode layer 33. With this configuration, the electrode layer 31 serves as an air electrode when air flows thereto, and the counter electrode layer 33 serves as a fuel electrode when hydrogen gas flows thereto, thus making it possible to use the electrochemical element A as a cell for a solid oxide fuel cell.

(3) In the above-described embodiments, the electrode layer 31 is arranged between the first plate-like body 1 and the electrolyte layer 32, and the counter electrode layer 33 is arranged on the opposite side of the first plate-like body 1 from the perspective of the electrolyte layer 32. A configuration is also possible in which the electrode layer 31 and the counter electrode layer 33 are provided in an inversed arrangement. Specifically, a configuration is also possible in which the counter electrode layer 33 is arranged between the first plate-like body 1 and the electrolyte layer 32, and the electrode layer 31 is arranged on the opposite side of the first plate-like body 1 from the perspective of the electrolyte layer 32. In this case, a change also needs to be made regarding the supply of gas to the electrochemical elements A.

That is, regarding the order of the electrode layer 31 and the counter electrode layer 33, and which is employed as a configuration in which the first gas is a reducing component gas and the second gas is an oxidative component gas or a configuration in which the first gas is an oxidative component gas and the second gas is a reducing component gas, various aspects can be employed as long as the electrode layer 31 and the counter electrode layer 33 are arranged such that the first gas and the second gas flows thereto so as to appropriately react with each other.

(4) Although the electrochemical reaction portion 3 is provided on a side of the first plate-like body 1 opposite to the second plate-like body 2 so as to cover the gas-permeable portion 1A in the above-described embodiments, the electrochemical reaction portion 3 may also be provided on the second plate-like body 2 side of the first plate-like body 1. That is, the present invention can be achieved even when a configuration is employed in which the electrochemical reaction portion 3 is arranged in the internal passage A1.

(5) Although the first penetrated portion 41 and the second penetrated portion 51 are provided as a pair at the two end portions of the rectangular plate-like support in the embodiments described above, there is no limitation to the configuration in which they are provided at the two end portions. A configuration may also be employed in which two or more pairs are provided. The first penetrated portion 41 and the second penetrated portion 51 need not be provided as a pair. Accordingly, one or more first penetrated portion 41 and one or more second penetrated portion 51 can be provided.

Furthermore, the shape of the plate-like support is not limited to a rectangular shape, and various shapes such as a square shape and a circular shape can be employed.

(6) There is no limitation on the shapes of the first annular sealing portion 42 and the second annular sealing portion 52 as long as a configuration is obtained in which the first penetrated portions 41 are in communication with each other, the second penetrated portions 51 are in communication with each other, and leakage of gas can be prevented. That is, it is sufficient that the first annular sealing portion 42 and the second annular sealing portion 52 has an endless shape provided with an opening portion that is in communication with the penetrated portion therein, and is configured to seal a gap between the adjacent electrochemical elements A. The first annular sealing portion 42 and the second annular sealing portion 52 have, for example, an annular shape. The annular shape may be any of an annular circle, an annular ellipse, an annular square, an annular polygon, and the like.

(7) In the description above, the plate-like support 10 includes the first plate-like body 1 and the second plate-like body 2. Separate plate-like bodies may be used to form the first plate-like body 1 and the second plate-like body 2, or a single plate-like body as shown in FIG. 13 may be used to form the first plate-like body 1 and the second plate-like body 2. In the case shown in FIG. 13, the first plate-like body 1 and the second plate-like body 2 are stacked by folding a single plate-like body. The first plate-like body 1 and the second plate-like body 2 are integrated by, for example, welding the peripheral portions 1a. It should be noted that a continuous seamless plate-like body may be used to form the first plate-like body 1 and the second plate-like body 2 and may be folded to be shaped as shown in FIG. 13.

Moreover, as described later, the second plate-like body 2 may be constituted by a single member or two or more members. Similarly, the first plate-like body 1 may be constituted by a single member or two or more members.

(8) The above-mentioned second plate-like body 2 forms the internal passage A1 together with the first plate-like body 1. The internal passage A1 includes the distribution portion A12, a plurality of auxiliary passages A11, and the confluence portion A13. As shown in FIG. 1, the first gas supplied to the distribution portion A12 is distributed and supplied to the plurality of auxiliary passages A11, and merges in the confluence portion A13 after leaving the auxiliary passages A11 through the exits. Accordingly, the first gas flows in a gas-flowing direction from the distribution portion A12 toward the confluence portion A13.

The plurality of auxiliary passages A11 is formed by shaping the portion of the second-plate like body 2 other than the portions corresponding to the distribution portion A12 and the confluence portion A13 into a wavelike shape. As shown in FIG. 5, the plurality of auxiliary passages A11 form a wavelike shape in a cross-sectional view taken in a flow-intersection direction that intersects the direction in which the first gas flows. The plurality of auxiliary passages A11 are formed by extending the wavelike plate in the gas flowing direction shown in FIG. 1. The plurality of auxiliary passages A11 may be formed of a continuous wavelike plate-like body or two or more wavelike plate-like bodies between the distribution portion A12 and the confluence portion A13. For example, the plurality of auxiliary passages A11 may be formed of two or more wavelike plate-like bodies that are separate from each other in a direction extending in the gas flowing direction, or two or more wavelike plate-like bodies that are separate from each other in a direction extending in the flow-intersection direction.

As shown in FIG. 5, the plurality of auxiliary passages A11 form a wavelike shape by repeatedly forming crests and troughs with the same shape. However, the second plate-like body 2 may include a plate-like portion in the region provided with the plurality of auxiliary passages A11. For example, the plurality of auxiliary passages A11 may be formed by forming plate-like portions and protruding portions alternately. The protruding portions can be used as portions in which a fluid such as the first gas flows.

(9) The portion of the above-mentioned second plate-like body 2 corresponding to the plurality of auxiliary passages A11 need not be formed in a wavelike shape as a whole, and it is sufficient that at least a portion thereof is formed in a wavelike shape. For example, the second plate-like body 2 may be formed such that a portion in the gas flowing direction has a flat shape and the portion other than the flat portion has a wavelike shape, between the distribution portion A12 and the confluence portion A13. The second plate-like body 2 may also be formed such that a portion in the flow-intersection direction has a flat shape and the portion other than the flat portion has a wavelike shape.

(10) A structure that can improve power generation efficiency can be provided in the above-mentioned internal passage A1. The following is a description of such a configuration. A description of portions that are the same as those of the embodiments described above is simplified or omitted.

(I) Specific Configuration of Electrochemical Module M

Next, the specific configuration of the electrochemical module M will be described with reference to FIGS. 14 to 31 and the like. The electrochemical module M includes the electrochemical element stack S shown in FIG. 11.

As shown in FIGS. 14 to 31 and the like, the stacking direction of the electrochemical element stack S includes the +Z direction and −Z direction (Z direction). The direction in which the first gas flows between the first plate-like body 1 and the second plate-like body 2 from the first gas supply unit 61 side toward the first gas discharge unit 62 side, and, similarly, the direction in which the second gas flows between the first plate-like body 1 and the second plate-like body 2 from the second gas supply unit 71 side toward the second gas discharge unit 72 side include the +X direction and −X direction (X direction) intersecting the +Z direction and −Z direction (Z direction). The direction that intersects the +Z direction and −Z direction (Z direction) and the +X direction and −X direction (X direction) includes the +Y direction and −Y direction (Y direction). The XZ plane, the XY plane, and the YZ plane are substantially orthogonal to one another.

As shown in FIGS. 1, 11, and the like, the electrochemical module M includes: the first gas supply unit 61 for supplying a first gas to the internal passages A1 via the supply passage 4; the first gas discharge unit 62 for discharging the first gas used in a reaction; the second gas supply unit 71 for supplying a second gas from the outside to the flowing portions A2; the second gas discharge unit 72 for discharging the second gas used in a reaction; and an output portion 8 to which output generated by an electrochemical reaction in the electrochemical reaction portion 3 is provided, wherein the distribution chamber 9 for distributing and supplying the second gas supplied from the second gas supply unit 71, to the flowing portions A2 is provided inside the housing B.

Figure 14:
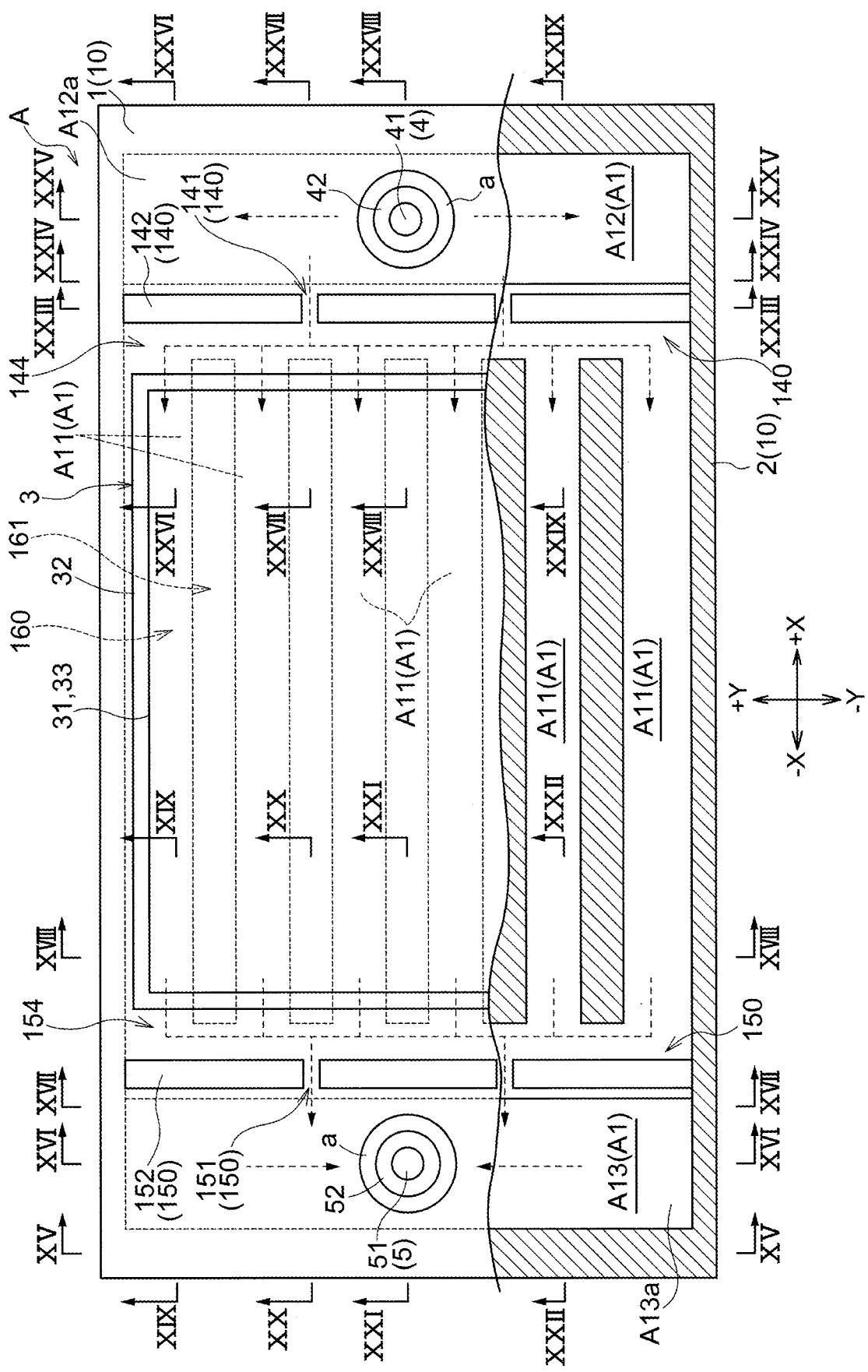
FIG. 14 is a schematic view of another electrochemical element.
Figure 15:
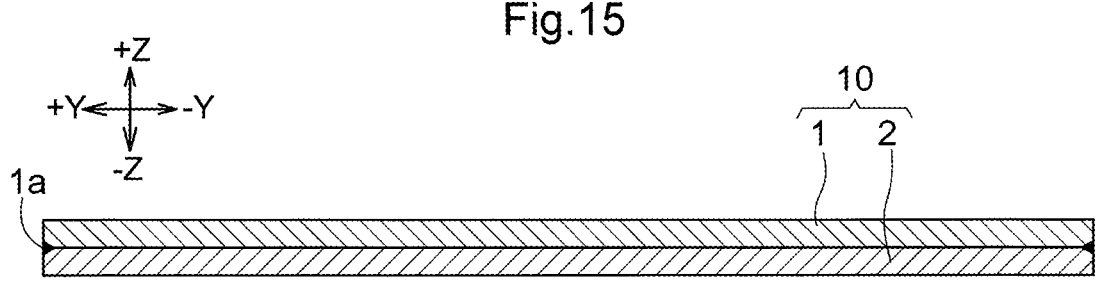
FIG. 15 is a cross-sectional view taken along line XV-XV in FIG. 14.
Figure 16:
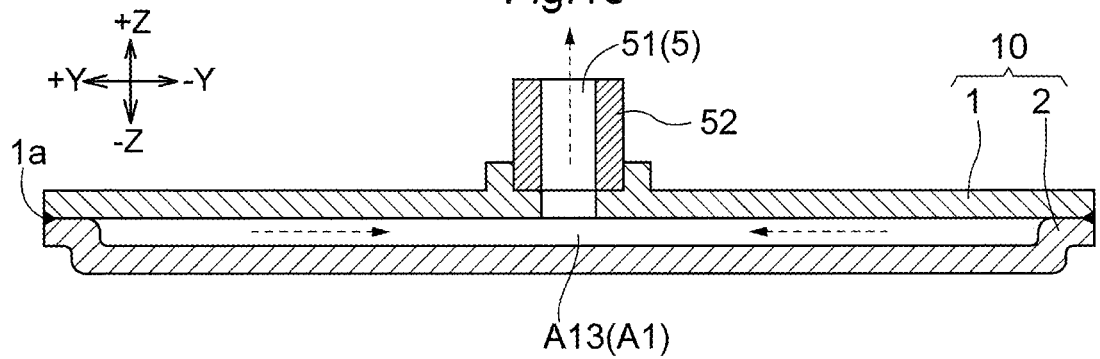
FIG. 16 is a cross-sectional view taken along line XVI-XVI in FIG. 14.
Figure 17:
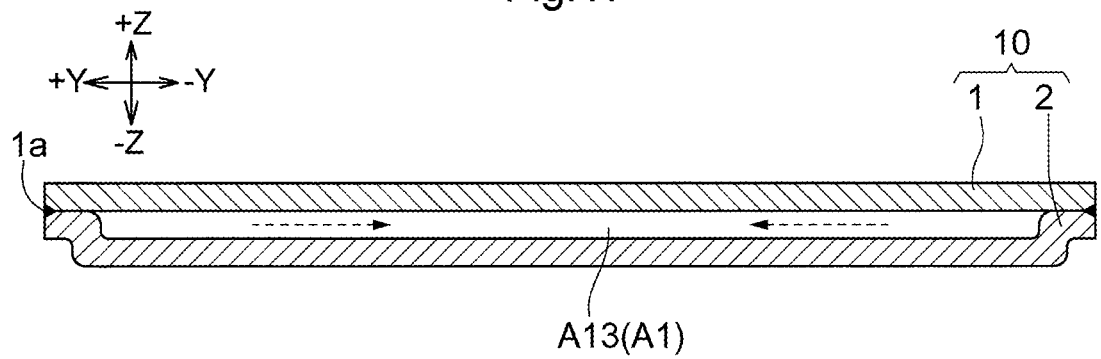
FIG. 17 is a cross-sectional view taken along line XVII-XVII in FIG. 14.
Figure 18:
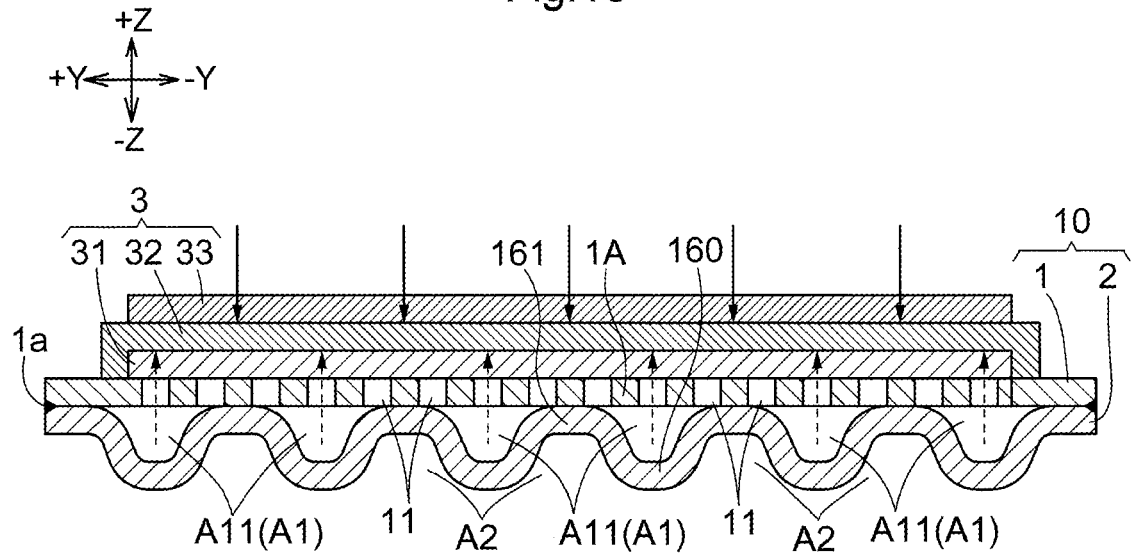
FIG. 18 is a cross-sectional view taken along line XVIII-XVIII in FIG. 14.

Accordingly, in the electrochemical module M, the fuel gas (also referred to as the "first gas") is supplied from the first gas supply unit 61 and air (also referred to as the "second gas") is supplied from the second gas supply unit 71, so that the fuel gas enters as indicated by dashed arrows and the air enters as indicated by solid arrows as shown in FIGS. 11, 14, and the like.

The fuel gas supplied from the first gas supply unit 61 is introduced into the supply passage 4 through the first penetrated portion 41 of the topmost electrochemical element A of the electrochemical element stack S, and flows from the supply passage 4 partitioned by the first annular sealing portions 42 into the internal passages A1 in all of the electrochemical elements A. Moreover, the air supplied from the second gas supply unit 71 temporarily flows into the distribution chamber 9, and then flows into the flowing portions A2 formed between the electrochemical elements A. In this embodiment, the flowing direction in which the fuel gas flows in the internal passage A1 along the flat face of the plate-like support 10 is a direction extending from the +X side toward the −X side. Similarly, the flowing direction in which the air flows in the flowing portion A2 along the flat face of the plate-like support 10 is a direction extending from the +X side toward the −X side.

Incidentally, when the second plate-like body 2 (a portion of a plate-like support 10) is considered as a base, the internal passage A1 is formed between the first plate-like body 1 (a portion of the plate-like support 10) and the second plate-like body 2 at a position at which a portion of the second plate-like body 2 with a wavelike plate-like shape bulges from the first plate-like body 1, and such a portion comes into contact with the electrochemical reaction portion 3 of the adjacent electrochemical element A and can be electrically connected thereto. On the other hand, a portion of the second plate-like body 2 with a wavelike plate-like shape that is in contact with the first plate-like body 1 is electrically connected to the first plate-like body 1, and the flowing portion A2 is formed between the second plate-like body 2 and the electrochemical reaction portion 3 of the adjacent electrochemical element A.

Figure 30:
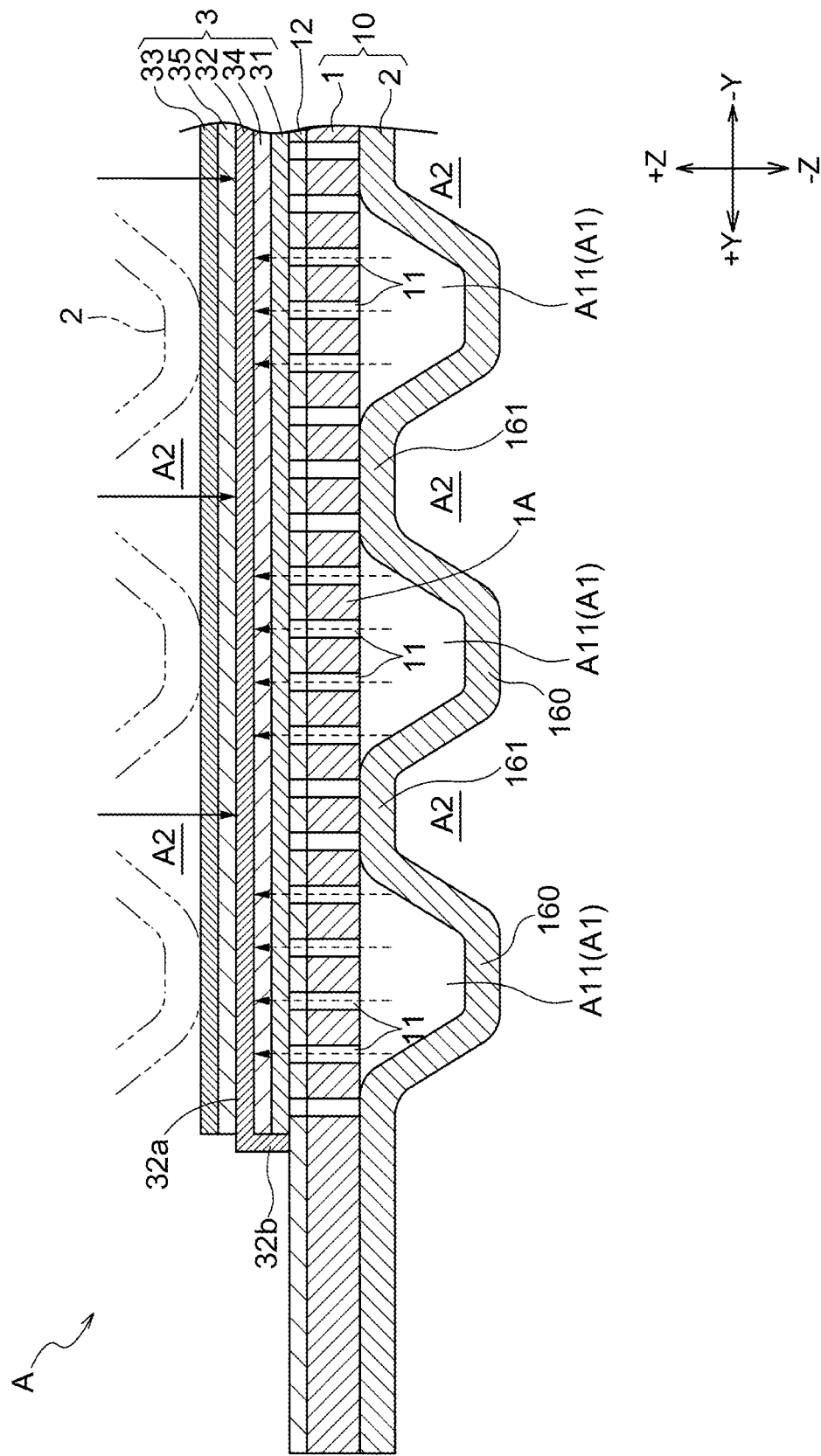
FIG. 30 is an enlarged view of a relevant portion of an electrochemical reaction portion.

Portions of FIG. 30 and the like show a cross section of an electrochemical element A including the internal passage A1 and a cross section of an electrochemical element A including the flowing portion A2 that are aligned for the sake of convenience. The fuel gas supplied from the first gas supply unit 61 reaches the distribution portion A12 (see FIGS. 14 to 17 and the like), flows and spreads in the width direction of one end portion via the distribution portion A12, and reaches auxiliary passages A11 of the internal passage A1 (see FIGS. 14 to 17 and the like).

As shown in FIG. 14 and the like, the internal passage A1 includes the distribution portion A12, the plurality of auxiliary passages A11, and the confluence portion A13, which will be described later. The internal passage A1 further includes a supply buffer portion 144 provided between the distribution portion A12 and the plurality of auxiliary passages A11, and a discharge buffer portion 154 provided between the plurality of auxiliary passages A11 and the confluence portion A13.

The internal passage A1 is formed by a space formed between the first plate-like body 1 and the second plate-like body 2, which are opposed to each other. In this embodiment, the first plate-like body 1 has a flat shape and is provided with the gas-permeable portion 1A, which will be described later. The second plate-like body 2 includes portions protruding upward with respect to the stacking direction and portions recessed downward. Accordingly, when the first plate-like body 1 and the second plate-like body 2 are combined in a state of being opposed to each other, the portions of the second plate-like body 2 protruding upward come into contact with the first plate-like body 1. A space partitioned into the distribution portion A12, the supply buffer portion 144, the plurality of auxiliary passages A11, the discharge buffer portion 154, the confluence portion A13, and the like is formed by the portions of the second plate-like body 2 recessed downward and the first plate-like body 1.

A supply structure 140 is provided between the distribution portion A12 and the plurality of auxiliary passages A11 in a direction extending in the direction in which the fuel gas flows (the +X direction and −X direction (X direction)), which will be described in detail later. Due to the supply structure 140, the fuel gas is temporarily stored in the distribution portion A12, and supply of the fuel gas from the distribution portion A12 to the plurality of auxiliary passages A11 is limited.

A discharge structure 150 is provided between the plurality of auxiliary passages A11 and the confluence portion A13 in a direction extending in the direction in which the fuel gas flows. Due to the discharge structure 150, discharge of the fuel gas from the plurality of auxiliary passages A11 to the confluence portion A13 is limited.

The fuel gas flows in the first gas supply unit 61, the first annular sealing portion 42, the first penetrated portion 41, and the like, and is supplied to the distribution portion A12 of each electrochemical element A. The fuel gas supplied to the distribution portion A12 is temporarily stored in the distribution portion A12 due to the supply structure 140. Then, the fuel gas is introduced into the plurality of auxiliary passages A11 from the distribution portion A12.

The fuel gas that has entered the auxiliary passages A11 flows in the auxiliary passages A11, and enters the electrode layer 31 and the electrolyte layer 32 through the gas-permeable portion 1A. Moreover, the fuel gas further flows in the auxiliary passages A11 together with the fuel gas used in an electrochemical reaction. After reaching the ends of the plurality of auxiliary passages A11 in the flowing direction, the fuel gas flows into the confluence portion A13 in a state in which flowing into the confluence portion A13 is partially limited due to the discharge structure 150. The fuel gas that has entered the confluence portion A13 flows in the confluence portion A13, the second penetrated portion 51, and the second annular sealing portion 52, and the like. Then, the fuel gas is discharged to the outside from the first gas discharge unit 62 together with the fuel gas used in an electrochemical reaction in other electrochemical elements A.

On the other hand, the air supplied from the second gas supply unit 71 enters the flowing portions A2 via the distribution chamber 9, and then can enter the counter electrode layers 33 and the electrolyte layers 32. Moreover, the air further flows in the flowing portions A2 along the electrochemical reaction portions 3 together with air used in an electrochemical reaction, and is discharged from the second gas discharge unit 72 to the outside.

With this configuration, the electrochemical elements A are connected in series between the collectors 81 and 82 due to the contact between the second plate-like body 2 and the electrochemical reaction portion 3 of the adjacent electrochemical elements A, and thus power generated following the fuel gas flow and the air flow in the electrochemical reaction portions 3 is extracted from the output portion 8 as composite output.

The configuration of the electrochemical element stack S will be described later in detail.

(II) Configurations of Internal Passage and Second Plate-Like Body

The configuration of the internal passage A1 formed by the first plate-like body 1 and the second plate-like body 2 that are opposed to each other will be further described.

In this embodiment, the internal passage A1 is formed by the inner faces of the first plate-like body 1 having a flat shape and the second plate-like body 2 formed in an uneven shape including portions protruding upward (in the +Z direction) in the stacking direction or portions recessed downward (in the −Z direction) in the stacking direction, the first plate-like body 1 and the second plate-like body 2 being combined in a state of being opposed to each other. The internal passage A1 includes the distribution portion A12, the supply buffer portion 144, the plurality of auxiliary passages A11, the discharge buffer portion 154, and the confluence portion A13. Moreover, the internal passage A1 further includes supply passing portions 141 (portions of the supply structure 140) and discharge passing portions 151 (portions of the discharge structure 150) through which the first gas passes.

It should be noted that the structure on the supply passage 4 side on which the first gas supply unit 61, the first annular sealing portion 42, the first penetrated portion 41, and the like are provided and the structure on the discharge passage 5 side on which the first gas discharge unit 62, the second annular sealing portion 52, the second penetrated portion 51, and the like are provided are symmetrical to each other. FIGS. 15 to 17, FIGS. 19 to 22, and the like show cross-sectional views of the discharge passage 5 side on which the first gas discharge unit 62, the second annular sealing portion 52, the second penetrated portion 51, and the like are provided. On the other hand, FIGS. 23 to 29 and the like show cross-sectional views of the supply passage 4 side on which the first gas supply unit 61, the first annular sealing portion 42, the first penetrated portion 41, and the like are provided. In the cross-sectional views of the discharge passage 5 side shown in FIGS. 15 to 17, FIGS. 19 to 22, and the like, the first gas flows in the direction in which the first gas is discharged from the plurality of auxiliary passages A11 to the second penetrated portion 51 and the like via the confluence portion A13. On the other hand, in the cross-sectional views of the supply passage 4 side shown in FIGS. 23 to 29, the first gas flows in the direction in which the first gas is supplied from the distribution portion A12 to the plurality of auxiliary passages A11 via the first penetrated portion 41 and the like.

Figure 31:
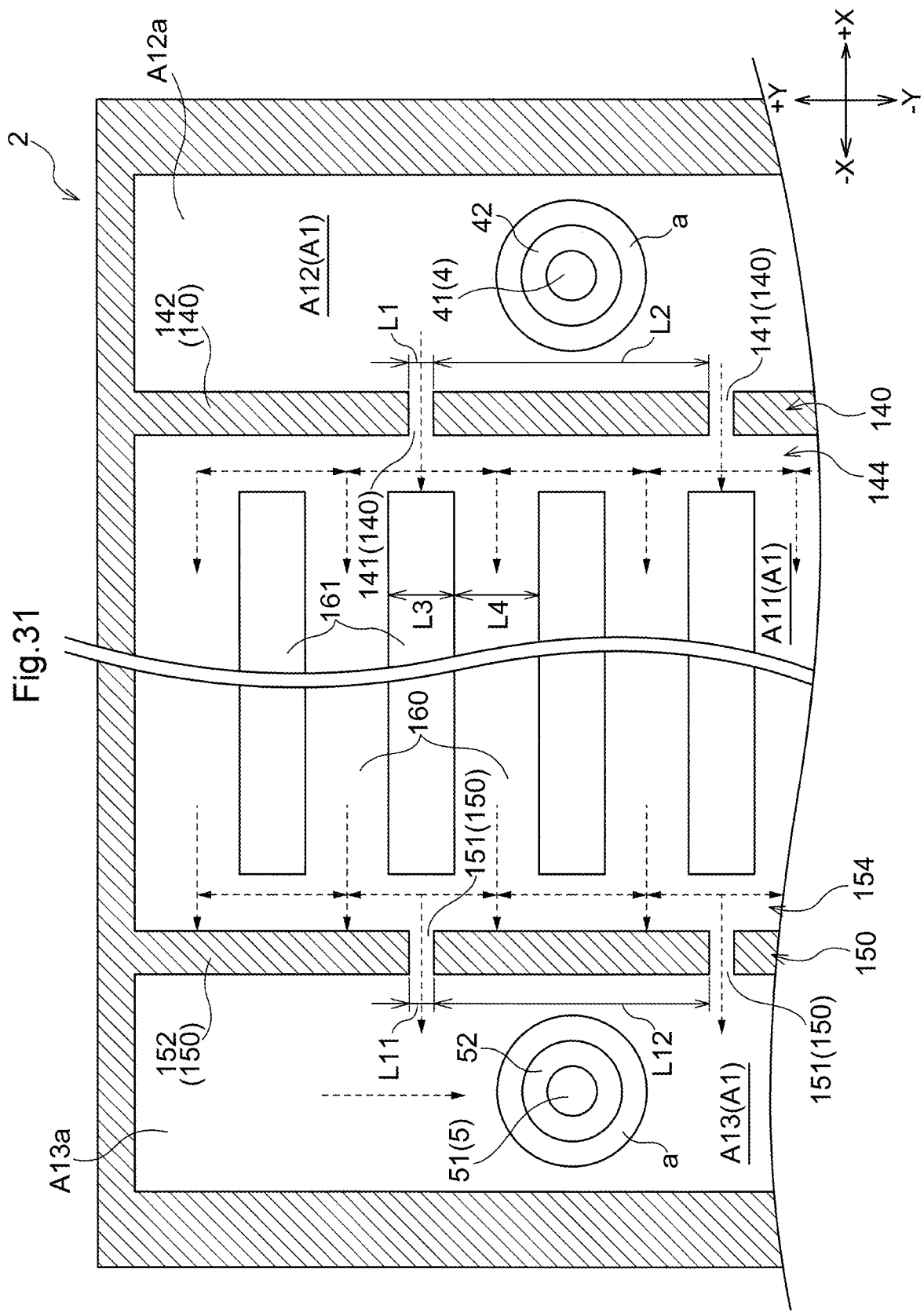
FIG. 31 is an explanatory diagram of a supply structure and a discharge structure.

The distribution portion A12 is provided corresponding to each electrochemical element A. The distribution portion A12 is provided on the supply passage 4 side and serves as a buffer portion for supplying the first gas to each electrochemical element A. The distribution portion A12 is provided on the upstream side of the plurality of the auxiliary passages A11 in the internal passage A1 in the direction in which the first gas flows (in the direction from the +X side toward the −X side). As shown in FIG. 14, FIG. 31, and the like, the distribution portion A12 is provided with the first penetrated portion 41 that passes through the second plate-like body 2 at the substantially central portion in the direction intersecting the flowing direction (+Y direction and −Y direction (Y direction)) and in the flowing direction (+X direction and −X direction (X direction)). The first gas flows in the first gas supply unit 61, the first annular sealing portion 42, the first penetrated portion 41, and the like and is supplied to the distribution portion A12 of each electrochemical element A.

Figure 25:
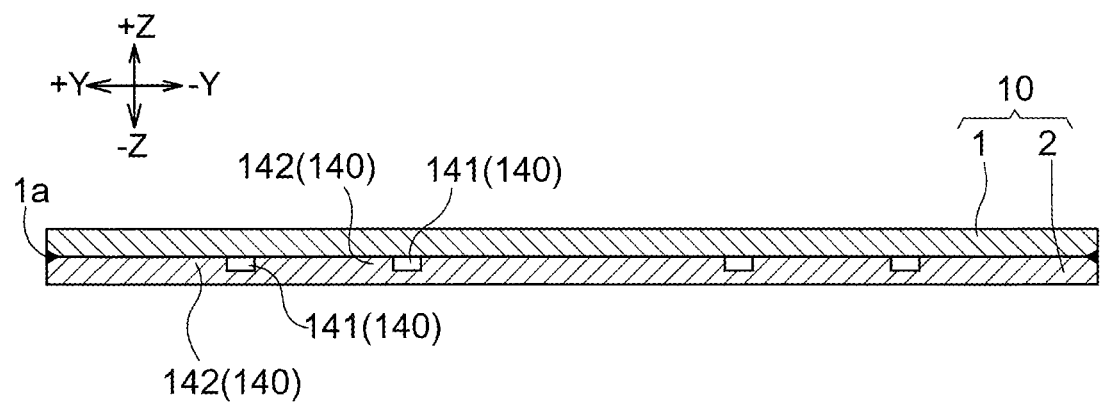
FIG. 25 is a cross-sectional view taken along line XXV-XXV in FIG. 14.
Figure 26:
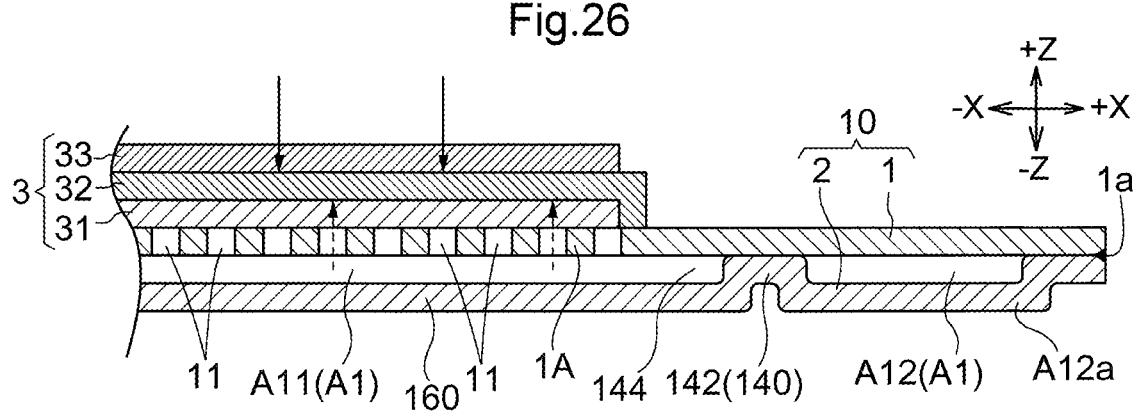
FIG. 26 is a cross-sectional view taken along line XXVI-XXVI in FIG. 14.
Figure 27:
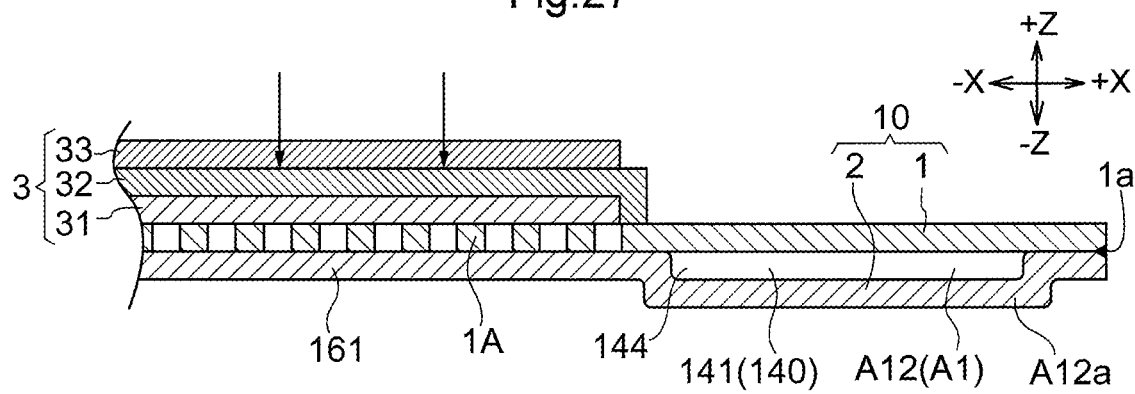
FIG. 27 is a cross-sectional view taken along line XXVII-XXVII in FIG. 14.
Figure 28:
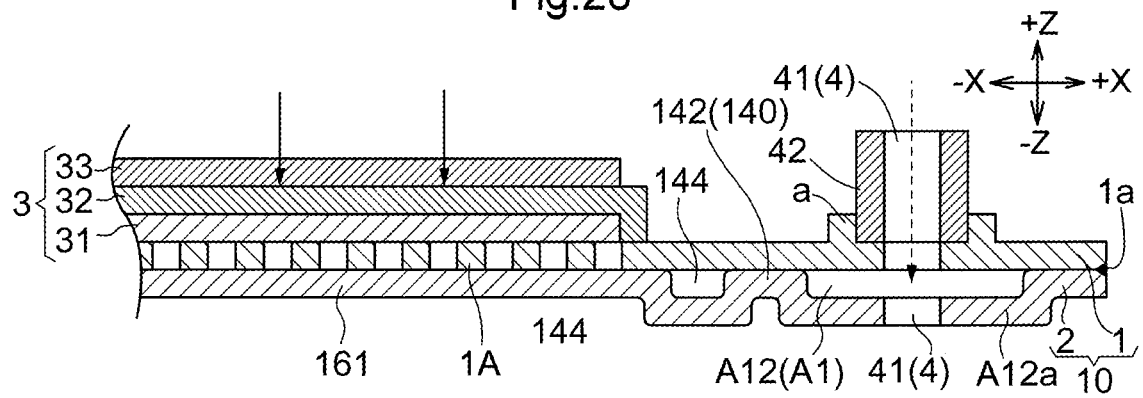
FIG. 28 is a cross-sectional view taken along line XXVIII-XXVIII in FIG. 14.
Figure 29:
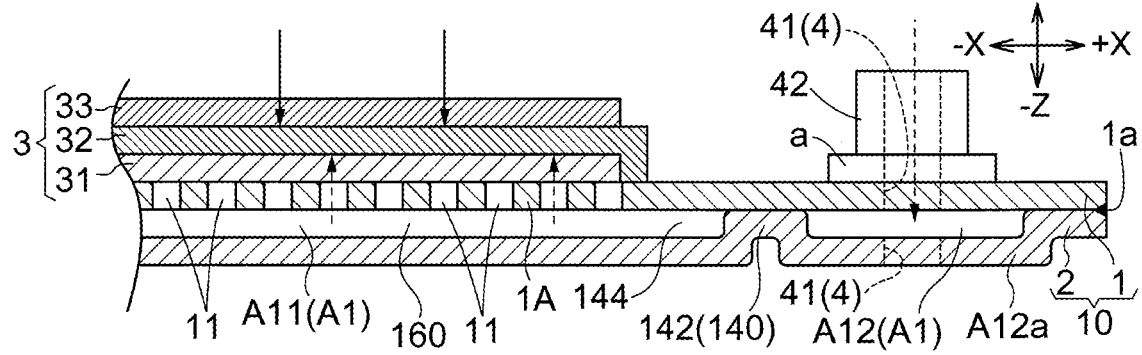
FIG. 29 is a cross-sectional view taken along line XXIX-XXIX in FIG. 14.

As shown in FIGS. 15 to 29 and the like, the first plate-like body 1 and the second plate-like body 2 are integrated by welding the edge portion at the peripheral portion 1a of the first plate-like body 1 and the edge portion at the peripheral portion 1a of the second plate-like body 2 to each other. The distribution portion A12 is formed by processing the second plate-like body 2 such that a portion thereof is recessed downward in the stacking direction (−Z direction) with respect to the peripheral portion 1a. More specifically, the distribution portion A12 is formed such that the location in the stacking direction changes at supply preventing portions 142 (portions of the supply structure 140). That is, as shown in FIG. 26 and the like, the top face of the distribution portion A12 is located below the top faces of the supply preventing portions 142 in the stacking direction. The top faces of the supply preventing portions 142 are in contact with the bottom face of the first plate-like body 1. Accordingly, discharge, from the distribution portion A12, of the first gas introduced into the distribution portion A12 is limited due to the supply preventing portions 142 protruding upward in the stacking direction, and the first gas is temporarily stored in the distribution portion A12 formed in a recessed shape.

As shown in FIG. 14 and the like, the distribution portion A12 is elongated in the +Y direction and −Y direction (Y direction) as viewed from above. The length in the Y direction of the distribution portion A12 corresponds to the length in the Y direction of the region provided with the plurality of auxiliary passages A11 that are arranged in parallel at intervals in the Y direction.

As shown in FIGS. 14 to 31, and the like, the plurality of auxiliary passages A11 in which the first gas flows extend in the flowing direction, namely the +X direction and −X direction (X direction). As described above, the plurality of auxiliary passages A11 are arranged in parallel at intervals in the Y direction. As shown in FIGS. 14 to 31, and the like, the second plate-like body 2 includes a plurality of auxiliary passage forming portions 160 for forming the plurality of auxiliary passages A11, and a plurality of partitioning portions 161 that are each provided between the adjacent auxiliary passage forming portions 160 to separate the adjacent auxiliary passages A11. As shown in FIG. 30 and the like, the auxiliary passage forming portions 160 are formed in a recessed shape with a bottom face, and the top faces of the partitioning portions 161 are located above the bottom faces of the auxiliary passage forming portions 160 in the stacking direction. The top faces of the partitioning portions 161 are in contact with the bottom face of the first plate-like body 1. Accordingly, the auxiliary passages A11 are separate from one another, and the first gas flows in each of the auxiliary passages A11 in the flowing direction.

It should be noted that, in FIG. 14 and the like, the auxiliary passages A11 extend in the flowing direction from the vicinity of the supply structure 140 to the vicinity of the discharge structure 150. However, there is no limitation to this configuration, and the auxiliary passages A11 may also be formed in only a portion of the region between the vicinity of the supply structure 140 and the vicinity of the discharge structure 150. That is, the auxiliary passage forming portions 160 for forming the auxiliary passages A11 may also be arranged in only a portion of the region between the vicinity of the supply structure 140 and the vicinity of the discharge structure 150.

As shown in FIGS. 30 and 31, in the +Y direction and −Y direction (Y direction; the intersection direction intersecting the flowing direction), the length L3 of each partitioning portion 161 is smaller than the length L4 of each auxiliary passage forming portion 160 (L3<L4). When L3 is smaller than L4, as shown in FIG. 30 and the like, the contact area between the top face of the partitioning portion 161 and the bottom face of the first plate-like body 1 can be reduced. That is, a space in the auxiliary passage A11 facing the first plate-like body 1 provided with the gas-permeable portion 1A can be increased, thus making it possible to increase the amount of the first gas flowing from the auxiliary passage A11 to the electrochemical reaction portion 3.

As shown in FIG. 14, FIGS. 23 to 31, and the like, the second plate-like body 2 includes the supply structure 140 between the distribution portion A12 and the plurality of auxiliary passages A11 in a direction extending in the flowing direction (+X direction and −X direction (X direction)). Due to the supply structure 140, the first gas is temporarily stored in the distribution portion A12, and supply of the first gas from the distribution portion A12 to the plurality of auxiliary passages A11 is limited.

The supply structure 140 includes a plurality of supply passing portions 141 and a plurality of supply preventing portions 142. The first gas flows from the distribution portion A12 to the plurality of auxiliary passages A11 through the supply passing portions 141. The supply preventing portions 142 prevent the first gas from flowing from the distribution portion A12 to the plurality of auxiliary passages A11. As shown in FIG. 25 and the like, the top faces of the supply preventing portions 142 are located above the top faces of the supply passing portions 141 in the stacking direction, and are in contact with the bottom face of the first plate-like body 1. Accordingly, while the supply preventing portion 142 prevents the first gas in the distribution portion A12 from flowing in the flowing direction, the first gas flows to the plurality of auxiliary passages A11 through the supply passing portions 141 in the flowing direction.

In this embodiment, as shown in FIGS. 14 and 31, for example, the supply preventing portions 142 are formed in a substantially rectangular shape. The rectangular supply preventing portions 142 are arranged in the Y direction such that the long sides extend in the +Y direction and −Y direction (Y direction). The supply passing portions 141 are each provided between the adjacent supply preventing portions 142. That is, the supply passing portions 141 are each provided in the interval between the short sides of the adjacent supply preventing portions 142 that are opposed to each other.

As shown in FIG. 31, in the +Y direction and −Y direction (Y direction; the intersection direction intersecting the flowing direction), the length L2 of each supply preventing portion 142 is larger than the length L1 of each supply passing portion 141 (L2>L1). It is preferable that the length L1 of each supply passing portion 141 is smaller than the length L3 of each partitioning portion 161 (L1<L3). This configuration allows the first gas ejected from the distribution portion A12 through the supply passing portions 141 to collide against the end portions on the +X side of the partitioning portions 161 and to be temporarily stored in the supply buffer portion 144, which will be described later.

The relationship between L1 and L2 is determined depending on, for example, the amount of the first gas supplied to the distribution portion A12 per unit time, the amount of the first gas to be supplied to the plurality of auxiliary passages A11 per unit time, the number of the supply preventing portions 142, the length L3 in the Y direction of each partitioning portion 161, the length L4 in the Y direction of each auxiliary passage A11, and the like.

As described above, the auxiliary passages A11 are separated by the partitioning portions 161. In the flowing direction (+X direction and −X direction (X direction)), the plurality of partitioning portions 161 are arranged such that any of the partitioning portions 161 corresponds to one supply passing portion 141.

Moreover, in the flowing direction, the plurality of auxiliary passages A11 are arranged such that at least one of the auxiliary passages A11 corresponds to one supply preventing portion 142.

The first gas is introduced into the plurality of auxiliary passages A11 from the distribution portion A12 through the supply passing portions 141. With the above-mentioned configuration, any of the partitioning portions 161 corresponds to one supply passing portion 141 in the flowing direction, and thus the first gas ejected from the distribution portion A12 into the supply passing portions 141 flows in the flowing direction and thus collides against the partitioning portions 161 protruding upward in the stacking direction. Due to the collision with the partitioning portions 161, the first gas flows in the intersection direction intersecting the flowing direction. That is, the first gas flowing from the distribution portion A12 through the supply passing portions 141 is not immediately introduced into the plurality of auxiliary passages A11, but collides against the partitioning portions 161 on the upstream side of the auxiliary passages A11 and flows in the intersection direction. Furthermore, the first gas flowing in the intersection direction does not return to the distribution portion A12 due to the supply preventing portions 142 protruding upward in the stacking direction, and is temporarily stored between the supply structure 140 and the plurality of auxiliary passages A11. Thereafter, the first gas flows along the ejection from the distribution portion A12 and is introduced into the plurality of auxiliary passages A11 formed by the plurality of auxiliary passage forming portions 160.

It should be noted that the region between the supply structure 140 and the plurality of auxiliary passages A11 in which the first gas is temporarily stored is the supply buffer portion 144.

In this embodiment, one of the partitioning portions 161 corresponds to one supply passing portion 141 in the flowing direction. However, there is no limitation to this configuration, and a plurality of partitioning portions 161 may correspond to one supply passing portion 141. A configuration may also be employed in which no partitioning portion 161 is correspond to one supply passing portion 141, and one partitioning portion 161 corresponds to another supply passing portion 141.

The supply preventing portion 142 is provided corresponding to the first penetrated portion 41 in the flowing direction. This makes it possible to reduce the possibility that the first gas flows to the plurality of auxiliary passages A11 immediately after being introduced into the distribution portion A12 from the first penetrated portion 41. Accordingly, the first gas can be temporarily stored in the distribution portion A12.

The number of the supply preventing portion 142 is, for example, two or more, but is not limited thereto. It is preferable to set the number of the supply preventing portions 142 in accordance with the number of the plurality of auxiliary passages A11.

In the description above, the supply preventing portions 142 are lined up in a row in the direction intersecting the flowing direction. However, there is no limitation to this arrangement as long as the first gas can be temporarily stored in the distribution portion A12, and the first gas can be substantially uniformly supplied to the plurality of auxiliary passages A11. For example, a plurality of supply preventing portions 142 may deviate from the intersection direction. A plurality of supply preventing portions 142 may be arranged in the intersection direction or deviate from the intersection direction.

In the description above, the supply preventing portions 142 have a rectangular shape. However, the shape of the supply preventing portions 142 is not limited thereto as long as gas can be uniformly supplied from the distribution portion A12 to the plurality of auxiliary passages A11. For example, the supply preventing portions 142 may also be formed in various shapes such as a square shape, a circular shape, an elliptical shape, and a triangular shape.

It is preferable that, as in the case of the embodiment shown in FIG. 14, FIG. 31, and the like, two of the plurality of supply preventing portions 142 are respectively provided at a position corresponding to the end portion on the +Y side of the distribution portion A12 and a position corresponding to the end portion on the −Y side thereof, but there is no limitation to this configuration. The first gas is distributed over the distribution portion A12 from the first penetrated portion 41 in the distribution portion A12 so as to spread in the space in the distribution portion A12, and collides against the end faces of the distribution portion A12. Accordingly, the first gas that has collided against the end faces of the distribution portion A12 may change its direction at the end faces and flow toward the plurality of auxiliary passages A11. Therefore, providing the supply preventing portions 142 at positions corresponding to the end portions of the distribution portion A12 makes it possible to reduce the possibility that the first gas immediately flows out of the distribution portion A12 into the plurality of auxiliary passages A11. This makes it possible to substantially uniformly supply the first gas from the distribution portion A12 to the auxiliary passages A11 as described later.

Next, the confluence portion A13 and the discharge structure 150 will be described. The confluence portion A13 and the discharge structure 150 respectively have the same structures as those of the distribution portion A12 and the supply structure 140.

The confluence portion A13 is provided on the discharge passage 5 side and serves as a buffer portion for discharging the first gas flowing in the plurality of auxiliary passages A11. The confluence portion A13 is provided on the downstream side of the plurality of the auxiliary passages A11 in the internal passage A1 in the direction in which the first gas flows. As shown in FIG. 14, FIG. 31, and the like, the confluence portion A13 is provided with the second penetrated portion 51 that passes through the second plate-like body 2 at the substantially central portion in the flowing direction and the direction intersecting the flowing direction. The first gas that has passed through the plurality of auxiliary passages A11 is introduced into the confluence portion A13, and is discharged to the outside via the second penetrated portion 51, the second annular sealing portion 52, the first gas discharge unit 62, and the like.

Figure 19:
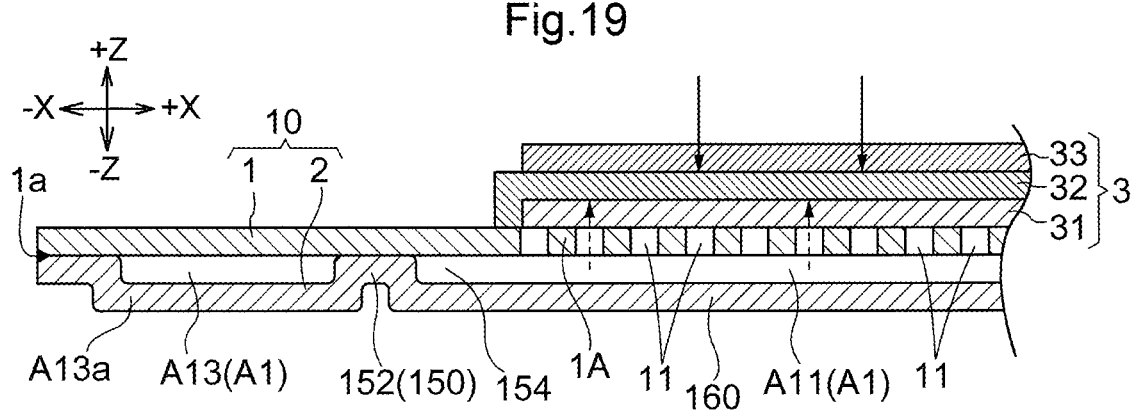
FIG. 19 is a cross-sectional view taken along line XIX-XIX in FIG. 14.
Figure 20:
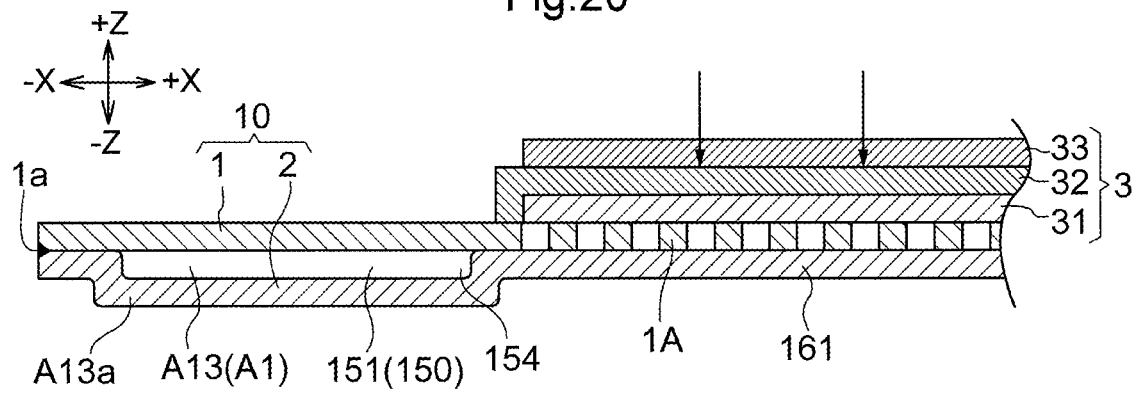
FIG. 20 is a cross-sectional view taken along line XX-XX in FIG. 14.
Figure 21:
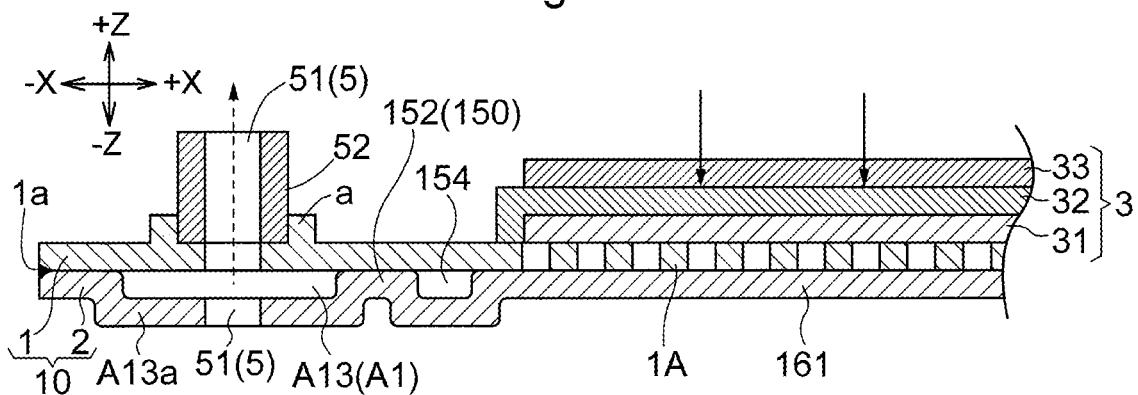
FIG. 21 is a cross-sectional view taken along line XXI-XXI in FIG. 14.
Figure 22:
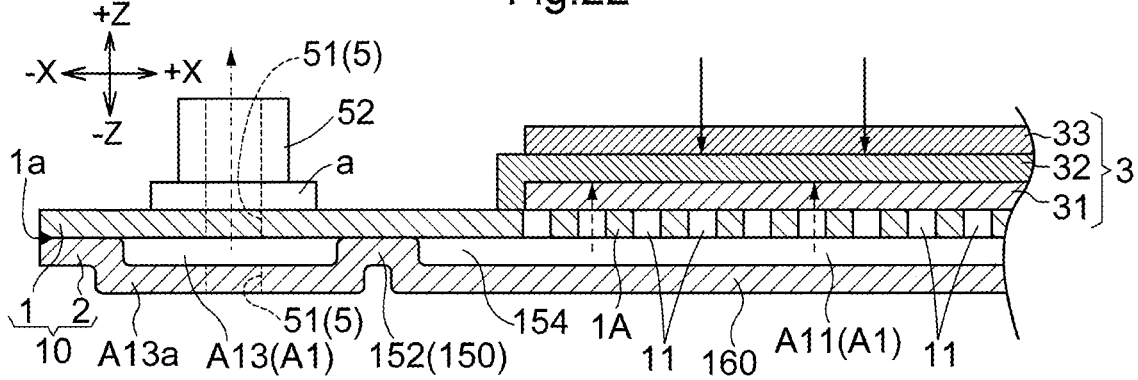
FIG. 22 is a cross-sectional view taken along line XXII-XXII in FIG. 14.
Figure 23:
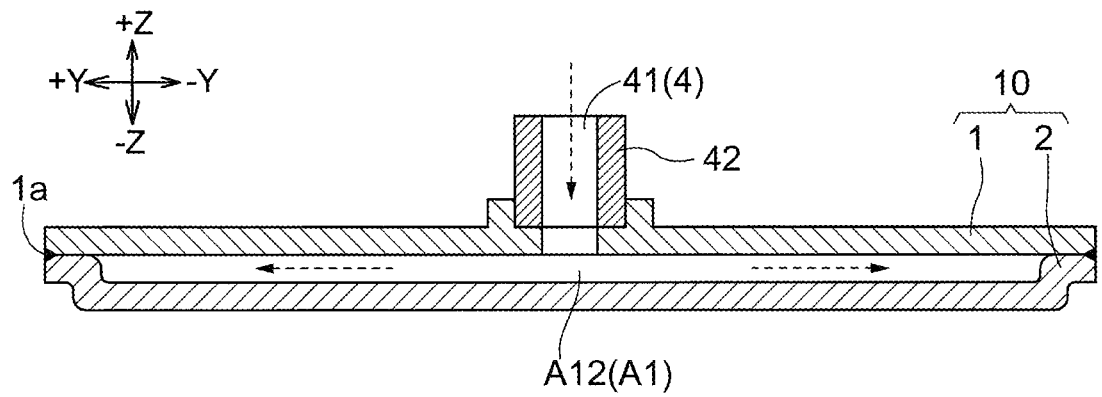
FIG. 23 is a cross-sectional view taken along line XXIII-XXIII in FIG. 14.
Figure 24:
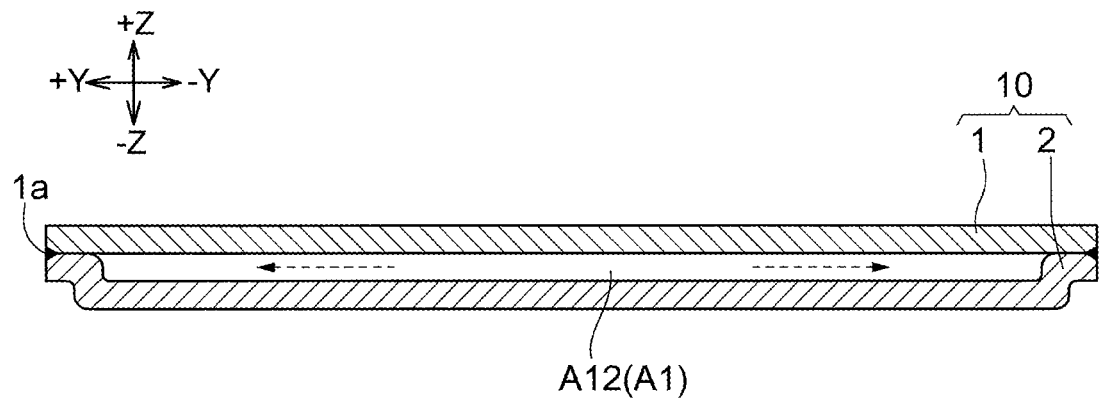
FIG. 24 is a cross-sectional view taken along line XXIV-XXIV in FIG. 14.

The confluence portion A13 is formed such that the location in the stacking direction changes at discharge preventing portions 152 (portions of the discharge structure 150). That is, as shown in FIG. 19 and the like, the top face of the confluence portion A13 is located below the top faces of the discharge preventing portions 152 in the stacking direction. The top faces of the discharge preventing portions 152 are in contact with the bottom face of the first plate-like body 1. Accordingly, discharge, from the confluence portion A13, of the first gas flowing from the plurality of auxiliary passages A11 to the confluence portion A13 is limited due to the discharge preventing portions 152 protruding upward in the stacking direction, and the first gas is temporarily stored in the plurality of auxiliary passages A11.

As shown in FIG. 14 and the like, the confluence portion A13 is elongated in the +Y direction and −Y direction (Y direction) as viewed from above. The length in the Y direction of the confluence portion A13 corresponds to the length in the Y direction of the region provided with the plurality of auxiliary passages A11 that are arranged in parallel at intervals in the Y direction.

As shown in FIG. 14, FIGS. 18 to 22, FIG. 31, and the like, the second plate-like body 2 includes the discharge structure 150 between the plurality of auxiliary passages A11 and the confluence portion A13 in a direction extending in the flowing direction (+X direction and −X direction (X direction)). Due to the discharge structure 150, discharge of the first gas from the plurality of auxiliary passages A11 to the confluence portion A13 is limited.

The discharge structure 150 includes a plurality of discharge passing portions 151 and a plurality of discharge preventing portions 152. The first gas flows from the plurality of auxiliary passages A11 to the confluence portion A13 through the discharge passing portions 151. The discharge preventing portions 152 prevent the first gas from flowing from the plurality of auxiliary passages A11 to the confluence portion A13. As shown in FIG. 19 and the like, the top faces of the discharge preventing portions 152 are located above the top faces of the discharge passing portions 151 in the stacking direction, and are in contact with the bottom face of the first plate-like body 1. Accordingly, while the discharge preventing portion 152 prevents the first gas in the plurality of auxiliary passages A11 from flowing in the flowing direction, the first gas flows to the confluence portion A13 through the discharge passing portions 151 in the flowing direction.

In this embodiment, as shown in FIGS. 14 and 31, for example, the discharge preventing portions 152 are formed in a substantially rectangular shape as in the case of the supply preventing portions 142. The rectangular discharge preventing portions 152 are arranged in the Y direction such that the long sides extend in the +Y direction and −Y direction (Y direction). The discharge passing portions 151 are each provided between the adjacent discharge preventing portions 152. That is, the discharge passing portions 151 are each provided in the interval between the short sides of the adjacent discharge preventing portions 152 that are opposed to each other.

As shown in FIG. 31, in the +Y direction and −Y direction (Y direction; the intersection direction intersecting the flowing direction), the length L12 of each discharge preventing portion 152 is larger than the length L11 of each discharge passing portion 151 (L12>L11). It is preferable that the length L12 of each discharge preventing portion 152 is larger than the length L4 of each auxiliary passage forming portion 160 (L12>L4). This configuration allows the first gas flowing from the plurality of auxiliary passages A11 to the confluence portion A13 to collide against the discharge preventing portions 152 and to be temporarily stored in the discharge buffer portion 154, which will be described later.

The relationship between L11 and L12 is determined depending on, for example, the amount of the first gas supplied to the plurality of auxiliary passages A11 per unit time, the amount of the first gas to be discharged from the confluence portion A13 per unit time, the number of the discharge preventing portions 152, the length L3 in the Y direction of each partitioning portion 161, the length L4 in the Y direction of each auxiliary passage A11, and the like.

In the flowing direction, the plurality of auxiliary passages A11 are arranged such that at least one of the auxiliary passages A11 corresponds to one discharge preventing portion 152.

Moreover, in the flowing direction, the plurality of partitioning portions 161 are arranged such that any one of the partitioning portions 161 corresponds to one discharge passing portion 151.

With the above-mentioned configuration, the first gas ejected from the plurality of auxiliary passages A11 flows in the flowing direction and thus collides against the discharge preventing portions 152 protruding upward in the stacking direction. Due to the collision with the discharge preventing portions 152, the first gas flows in the intersection direction intersecting the flowing direction. That is, the first gas flowing from the plurality of auxiliary passages A11 is not immediately introduced into the confluence portion A13, but collides against the discharge preventing portions 152 on the upstream side of the confluence portion A13 and flows in the intersection direction. Thereafter, the first gas flows along the ejection from the plurality of auxiliary passages A11, passes through the discharge passing portions 151, and is introduced into the confluence portion A13.

It should be noted that the region between the plurality of auxiliary passages A11 and the discharge structure 150 in which the first gas is temporarily stored is the discharge buffer portion 154.

The discharge preventing portion 152 is provided corresponding to the second penetrated portion 51 in the flowing direction. This makes it possible to reduce the possibility that the first gas flowing in the plurality of auxiliary passages A11 is immediately introduced into the confluence portion A13 and is discharged from the second penetrated portion 51. Accordingly, the first gas can be temporarily stored in the plurality of auxiliary passages A11.

The shapes, sizes, arrangements, numbers, and the like of the discharge passing portions 151 and the discharge preventing portions 152 are the same as those of the supply passing portions 141 and the supply preventing portions 142. For example, in FIG. 31, in the +Y direction and −Y direction (Y direction; the intersection direction intersecting the flowing direction), the length L12 of each discharge preventing portion 152 and the length L11 of each discharge passing portion 151 are respectively the same as the length L2 of each supply preventing portion 142 and the length L1 of each supply passing portion 141, which are described hereinbefore.

However, the shapes, sizes, arrangements, numbers, and the like of the discharge passing portions 151 and the discharge preventing portions 152 may be different from those of the supply passing portions 141 and the supply preventing portions 142. For example, the discharge passing portions 151 may be larger in size than the supply passing portions 141. Due to this configuration, the discharge pressure applied during discharge of the first gas from the plurality of auxiliary passages A11 to the confluence A13 may be smaller than the supply pressure during supply of the first gas from the distribution portion A12 to the plurality of auxiliary passages A11. The first gas is supplied from the distribution portion A12 to the plurality of auxiliary passages A11 with a certain level of supply pressure to make the flow distribution constant among the plurality of auxiliary passages A11, and the first gas can be smoothly introduced into the confluence portion A13 when discharged.

(b) Functions of Supply Structure and Discharge Structure
(b1) Functions of Supply Structure Next, the functions of the supply structure 140 will be described.

The supply preventing portions 142 of the supply structure 140 having the above-mentioned configuration are provided between the distribution portion A12 and the plurality of auxiliary passages A11, and serve as barriers for the flow of the first gas from the distribution portion A12 to the plurality of auxiliary passages A11. Accordingly, pressure loss of the first gas increases when the first gas flows from the distribution portion A12 into the plurality of auxiliary passages A11, and the first gas introduced into the distribution portion A12 is distributed over the distribution portion A12 so as to fill the distribution portion A12, and is thus temporarily stored therein. Accordingly, the overall pressure in the distribution portion A12 is substantially uniform (equal pressure). That is, differences in pressure between the distribution portion A12 and the plurality of auxiliary passages A11 are substantially the same. Then, the first gas is supplied from the distribution portion A12 to the plurality of auxiliary passages A11 through the supply passing portions 141, and therefore, the first gas is supplied to the auxiliary passages A11 with substantially equal pressure. Accordingly, the flow distribution (including the flow rate, the flow amount, the pressure, and the like) of the first gas in the flow direction is substantially uniform among the auxiliary passages A11.

Flow of the first gas from the distribution portion A12 is divided and introduced into the plurality of auxiliary passages A11. The flow distribution (including the flow rate, the flow amount, the pressure, and the like) of the first gas is also made substantially equal by a flow straightening effect due to the first gas flowing separately in a plurality of passages compared with the case where the first gas flows in an internal passage that is not provided with a plurality of passages.

As described above, the flow distribution of the first gas in the flowing direction is substantially uniform among the auxiliary passages A11. For example, when the auxiliary passages A11 are viewed at one position in the flowing direction, the flow rate, the flow amount, the pressure, and the like of the first gas in the intersection direction intersecting that position is substantially constant among the auxiliary passages A11. Accordingly, in the electrochemical reaction portion 3, a difference between a portion that is deficient in the first gas and a portion in which an excessive amount of the first gas flows can be reduced to improve the usage rate of the first gas in the overall electrochemical element A and thus improve the reaction efficiency of an electrochemical reaction.

It should be noted that, if the above-mentioned configuration including the distribution portion A12, the plurality of auxiliary passages A11, the supply structure 140, and the like is not employed, the auxiliary passages A11 differ in the flow distribution of the first gas. That is, the flow rate of the first gas may be fast in a certain auxiliary passage A11, and the flow rate of the first gas may be slow in another auxiliary passage A11. In an auxiliary passage A11 in which the flow rate of the first gas is slow, the first gas is consumed in an electrochemical reaction and becomes insufficient. Accordingly, the concentration of the first gas decreases, and thus there is a risk that the electrode layer of the electrochemical reaction portion 3 deteriorates due to oxidation, and the electrode performance and the mechanical strength are thus impaired. On the other hand, in an auxiliary passage A11 in which the flow rate of the first gas is fast, the first gas is discharged before being consumed in an electrochemical reaction. That is, in the case where the first gas is fuel gas such as hydrogen, the fuel usage rate decreases because a high-concentration first gas is discharged. To address the shortage of the first gas in an auxiliary passage A11 in which the flow rate of the first gas is slow, it is conceivable that the supply amount of the first gas supplied to each auxiliary passage A11 is increased. However, in this case, the amount of the first gas discharged before being consumed in an electrochemical reaction is further increased in an auxiliary passage A11 in which the flow rate of the first gas is fast, and thus the fuel usage rate further decreases. Accordingly, when the flow distribution of the first gas varies among the auxiliary passages A11, the reaction efficiency of an electrochemical reaction decreases, and thus power generation efficiency decreases.

(b2) Functions of Discharge Structure

Next, the functions of the discharge structure 150 will be described.

With the above-mentioned configuration, the supply structure 140 for supplying the first gas from the distribution portion A12 to the plurality of auxiliary passages A11 with substantially uniform flow distribution is provided, and in addition, the discharge structure 150 is provided at a position where the first gas enters the confluence portion A13 from the plurality of auxiliary passages A11. The plurality of auxiliary passages A11 are located between the supply structure 140 and the discharge structure 150, thus making it possible to make the flow distribution (including the flow rate, the flow amount, the pressure, and the like) of the first gas substantially uniform among the plurality of auxiliary passages A11 and to improve the reaction efficiency of an electrochemical reaction.

The following is a more specific description. The discharge preventing portions 152 of the discharge structure 150 having the above-mentioned configuration are provided between the plurality of auxiliary passages A11 and the confluence portion A13, and serve as barriers for the flow of the first gas from the auxiliary passages A11 to the confluence portion A13. Accordingly, pressure loss of the first gas increases when the first gas flows from the plurality of auxiliary passages A11 into the confluence portion A13. Therefore, the first gas introduced into the plurality of auxiliary passages A11 is less likely to be immediately introduced into the confluence portion A13 from the plurality of auxiliary passages A11, and is distributed over the plurality of auxiliary passages A11 so as to fill the auxiliary passages A11. This makes it possible to make the flow distribution (including the flow rate, the flow amount, the pressure, and the like) of the first gas in the flowing direction substantially uniform among the plurality of auxiliary passages A11. Moreover, the first gas is distributed over the plurality of auxiliary passages A11 so as to fill the auxiliary passages A11, and therefore, an electrochemical reaction sufficiently occurs in the plurality of auxiliary passages A11. Accordingly, the reaction efficiency of an electrochemical reaction can be improved.

(11) In the embodiments described above, the electrochemical device includes the electrochemical module M including the plurality of electrochemical elements A. However, a configuration in which a single electrochemical element is included can be applied to the electrochemical device of the embodiment described above.

It should be noted that the configurations disclosed in the above-described embodiments can be used in combination with configurations disclosed in other embodiments as long as they are compatible with each other. The embodiments disclosed in this specification are illustrative, and embodiments of the present invention are not limited thereto and can be modified as appropriate without departing from the object of the present invention.

INDUSTRIAL APPLICABILITY

The present invention can be applied to an electrochemical element and a cell for a solid oxide fuel cell.

DESCRIPTION OF REFERENCE SIGNS

1: First plate-like body
1A: Gas-permeable portion
2: Second plate-like body
3: Electrochemical reaction portion 4: Supply passage
5: Discharge passage
8: Output portion
9: Distribution chamber
10: Plate-like support
31: Electrode layer
32: Electrolyte layer
33: Counter electrode layer
41: First penetrated portion
42: First annular sealing portion
51: Second penetrated portion
52: Second annular sealing portion
61: First gas supply unit
71: Second gas supply unit
100: Electrochemical device
102: Reformer
103: Fuel supply unit
104: Inverter
140: Supply structure
141: Supply passing portion
142: Supply preventing portion
144: Supply buffer portion
150: Discharge structure
151: Discharge passing portion
152: Discharge preventing portion
154: Discharge buffer portion
160: Auxiliary passage forming portion
161: Partitioning portion
A: Electrochemical element
A1: Internal passage
A11: Auxiliary passage
A12: Distribution portion
A13: Confluence portion
A2: Flowing portion
B: Housing
M: Electrochemical module
S: Electrochemical element stack
Z: Energy system

The invention claimed is:

1. An electrochemical module comprising:
an electrochemical element stack comprising a plurality of electrochemical elements that are arranged in a stacked manner; and
a housing that is internally provided with the whole electrochemical element stack,
wherein each of the electrochemical elements includes conductive plate-like support provided with an internal passage therein,
wherein the plate-like support comprises:
   a gas-permeable portion through which gas is permeable between the internal passage, which is located inside the plate-like support, and the outside;
   an electrochemical reaction portion that entirely or partially covers the gas-permeable portion and includes at least a film-like electrode layer, a film-like electrolyte layer, and a film-like counter electrode layer in the stated order; and
   a first penetrated portion that forms a supply passage through which a first gas flows between the outside of the plate-like support in a surface penetration direction and the internal passage, the first gas being one of a reducing component gas and an oxidative component gas,
wherein at least a first electrochemical element and a second electrochemical element of the plurality of electrochemical elements are adjacently stacked,
wherein the plate-like support included in the first electrochemical element and the plate-like support included in the second electrochemical element are opposed to each other, an outer face of the plate-like support included in the first electrochemical element on which the electrochemical reaction portion is arranged is electrically connected to an outer face of the plate-like support included in the second electrochemical element other than an outer face on which the electrochemical reaction portion is arranged, and a flowing portion through which a second gas flows along the two adjacent outer faces is formed between the two outer faces, the second gas being the other of the reducing component gas and the oxidative component gas, and
wherein the electrochemical module further comprises a second gas supply unit that allows the second gas to flow from an outside of the housing to the flowing portion; and inside the housing, a distribution chamber in which the second gas that flows from the second gas supply unit flows and is distributed to the flowing portion.

2. The electrochemical module according to claim 1, wherein a first annular sealing portion serving as an annular sealing portion for separating the first penetrated portion that is formed on each of the two outer faces from the flowing portion is provided in the flowing portion, and
   wherein the supply passage through which the first gas flows to the internal passage is formed by the first penetrated portion and the first annular sealing portion.

3. The electrochemical module according to claim 1, wherein the plate-like support includes a second penetrated portion that forms a discharge passage through which the first gas that has flowed in the internal passage flows to the outside of the plate-like support in the surface penetration direction,
   wherein a second annular sealing portion serving as an annular sealing portion for separating the second penetrated portion that is formed on each of the two outer faces from the flowing portion is provided in the flowing portion, and
   wherein the discharge passage into which the first gas that has flowed in the internal passage flows is formed by the second penetrated portion and the second annular sealing portion.

4. The electrochemical module according to claim 2, wherein an insulating sealing portion that electrically insulates adjacent electrical elements from each other is used as the annular sealing portion.

5. An electrochemical element to be used in the electrochemical element stack of the electrochemical module according to claim 1, comprising the plate-like support,
   wherein the plate-like support includes the gas-permeable portion, the electrochemical reaction portion, and the first penetrated portion.

6. An electrochemical element according to claim 5, wherein the first gas flows through the first penetrated portion and the internal passage in a state of being separated from a second gas that flows along an outer face of the plate-like support, the second gas being the other of the reducing component gas and the oxidative component gas.

7. The electrochemical element according to claim 5, wherein the plate-like support includes a second penetrated portion through which the first gas that has flowed in the internal passage flows to the outside of the plate-like support in a surface penetration direction, and wherein the internal passage includes a plurality of auxiliary passages that lead from the first penetrated portion to the second penetrated portion.

8. The electrochemical element according to claim 7, further comprising a distribution portion that is located between the first penetrated portion and the internal passage in the plate-like support, is in communication with the auxiliary passages, and distributes the first gas that has flowed in the first penetrated portion, to the auxiliary passages.

9. The electrochemical element according to claim 5, wherein a film-like intermediate layer is arranged between the electrode layer and the electrolyte layer.

10. The electrochemical element according to claim 5, wherein a film-like reaction preventing layer is arranged between the counter electrode layer and the electrolyte layer.

11. The electrochemical element according to claim 5, wherein the internal passage includes a plurality of auxiliary passages through which the first gas flows in a predetermined flowing direction, and a distribution portion that is provided on an upstream side of the plurality of auxiliary passages in the first gas flowing direction, and
wherein the plate-like support includes a supply structure that is located between the distribution portion and the plurality of auxiliary passages in the flowing direction and with which the first gas is temporarily stored in the distribution portion and supply of the first gas from the distribution portion to the plurality of auxiliary passages is limited.

12. The electrochemical element according to claim 5, wherein the internal passage includes a confluence portion that is provided on a downstream side of a plurality of auxiliary passages in a predetermined direction in which the first gas flows, and
wherein the plate-like support includes a discharge structure that is located between the plurality of auxiliary passages and the confluence portion in the flowing direction and with which discharge of the first gas from the plurality of auxiliary passages to the confluence portion is limited.

13. The electrochemical module according to claim 1, further comprising:
a first gas supply unit that allows the first gas to flow from an outside of the housing to the internal passage via the supply passage.

14. The electrochemical module according to claim 1, wherein the distribution chamber is a space located on a lateral side of the electrochemical element stack relative to the electrochemical element stack in the housing, and
wherein the flowing portion has an opening on a side on which the space is located, and is in communication with the space through the opening.

15. An electrochemical device comprising:
an electrochemical module according to claim 1,
a fuel converter, and
a fuel supply unit that allows a reducing component gas to flow from the fuel converter to the electrochemical module, or from the electrochemical module to the fuel converter.

16. An electrochemical device comprising:
an electrochemical module according to claim 1, and
a power converter that extracts power from the electrochemical module, or supplies power to the electrochemical module.

17. An energy system comprising:
the electrochemical device according to claim 16; and
a waste heat utilization system that reuses heat discharged from the electrochemical device or the fuel converter.

18. An electrochemical device comprising:
the electrochemical element according to claim 5,
a fuel converter, and
a fuel supply unit that allows a reducing component gas to flow from the fuel converter to the electrochemical element, or from the electrochemical element to the fuel converter.

19. An electrochemical device comprising:
the electrochemical element according to claim 5,
and a power converter that extracts power from the electrochemical element, or supplies power to the electrochemical element.

* * * * *